United States Patent
Sugaya et al.

(10) Patent No.: US 12,382,516 B2
(45) Date of Patent: Aug. 5, 2025

(54) COMMUNICATION DEVICE AND COMMUNICATION METHOD

(71) Applicant: SONY GROUP CORPORATION, Tokyo (JP)

(72) Inventors: Shigeru Sugaya, Tokyo (JP); Ryuichi Hirata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 396 days.

(21) Appl. No.: 17/910,510

(22) PCT Filed: Mar. 3, 2021

(86) PCT No.: PCT/JP2021/008047
§ 371 (c)(1),
(2) Date: Sep. 9, 2022

(87) PCT Pub. No.: WO2021/187094
PCT Pub. Date: Sep. 23, 2021

(65) Prior Publication Data
US 2023/0134176 A1    May 4, 2023

(30) Foreign Application Priority Data
Mar. 17, 2020   (JP) .................. 2020-046667

(51) Int. Cl.
*H04W 74/08*   (2024.01)
(52) U.S. Cl.
CPC .............. *H04W 74/0875* (2013.01)
(58) Field of Classification Search
None
See application file for complete search history.

(56) References Cited

U.S. PATENT DOCUMENTS

| | | | |
|---|---|---|---|
| 12,144,044 B2 * | 11/2024 | Fang ................ | H04W 52/0229 |
| 2012/0051220 A1 * | 3/2012 | Nabetani .......... | H04W 74/0816 |
| | | | 370/235 |

(Continued)

FOREIGN PATENT DOCUMENTS

| | | |
|---|---|---|
| EP | 4185000 A1 | 5/2023 |
| JP | 2010-130280 A | 6/2010 |

(Continued)

OTHER PUBLICATIONS

Chunyu Hu (Facebook Inc): "Prioritized EDCA Channel Access Over Latency Sensitive Links in MLO", IEEE Draft; 11-20-0408-00-00BE-PRIORITIZED-EDCA-CHANNEL Access-Over-Latency-Sensitive-Links-In-MLO, IEEE-SA Mentor, Mar. 15, 2020 (Mar. 15, 2020), pp. 1-19, vol. 802.11 EHT; 802.11be Piscataway, NJ USA, XP068167050.

(Continued)

*Primary Examiner* — Faiyazkhan Ghafoerkhan
(74) *Attorney, Agent, or Firm* — CHIP LAW GROUP

(57) ABSTRACT

The present technology relates to a communication device and a communication method capable of transmitting data with a shorter waiting time. There is provided a communication device including a control unit that sets information regarding a priority of transmission on a plurality of links for each of access categories of data in a case where data is transmitted using a plurality of links corresponding to a predetermined frequency band. The present technology can be applied to, for example, a device constituting a wireless LAN system.

19 Claims, 23 Drawing Sheets

(56) References Cited

U.S. PATENT DOCUMENTS

| | | | | |
|---|---|---|---|---|
| 2020/0259896 A1* | 8/2020 | Sachs | ...................... | H04L 67/12 |
| 2022/0132611 A1* | 4/2022 | Fang | .................... | H04W 76/15 |
| 2022/0369403 A1* | 11/2022 | Fang | .................... | H04W 76/15 |
| 2023/0134176 A1* | 5/2023 | Sugaya | ............. | H04W 74/0875 |
| | | | | 370/329 |

FOREIGN PATENT DOCUMENTS

| | | | |
|---|---|---|---|
| JP | 2011-188451 A | 9/2011 |
| JP | 2016535534 A | 11/2016 |
| JP | 2017-158056 A | 9/2017 |
| JP | 2017537498 A | 12/2017 |
| JP | 2018-098603 A | 6/2018 |
| JP | 2019-071631 A | 5/2019 |
| WO | WO-2009069047 A | 6/2009 |
| WO | 2013/125177 A1 | 8/2013 |

OTHER PUBLICATIONS

Suhwook Kim(LG): "Latency enhancement in multi-link", IEEE Draft; 11-19-1851-01-00BE-LATENCY-ENHANCEMENT-IN. MULTI-LINK, IEEE-SA Mentor, Nov. 13, 2019 (Nov. 13, 2019), pp. 1-12, ol. 802.11 EHT; 802.11 be, No. 1, Piscataway, NJ USA, XP068164634.

International Search Report and Written Opinion of PCT Application No. PCT/JP2021/008047, issued on Jun. 1, 2021, 08 pages of ISRWO.

\* cited by examiner

FIG. 10

| Multi-Link Management | | | | | | |
|---|---|---|---|---|---|---|
| Link #1 Station Management Entity | MAC Sublayer Management Entity | Link #1 MAC Sublayer | Link #2 MAC Sublayer | MAC Sublayer Management Entity | Link #2 Station Management Entity |
| | PHY Layer Management Entity | Link #1 PHY Layer | Link #2 PHY Layer | PHY Layer Management Entity | |

FIG. 18

| Single/Multi Link Operation Information Element (SMLO IE) | | | | | | |
|---|---|---|---|---|---|---|
| Element ID | Length | Target Latency | Single-Link TXOP Available | Multi-Link Access Category Map | Single-Link Access Category Map | ... |

FIG. 19

| Multi-Link Access Category Map | | | | Single-Link Access Category Map | | | | |
|---|---|---|---|---|---|---|---|---|
| AC_VO | AC_VI | AC_BE | AC_BG | AC_VO | AC_VI | AC_BE | AC_BG | ... |
| 1 | 1 | 1 | 1 | 1 | 1 | 1 | 1 | |

*FIG. 20*

| Multi-Link Access Category Map | | | | Single-Link Access Category Map | | | | ... |
|---|---|---|---|---|---|---|---|---|
| AC_VO | AC_VI | AC_BE | AC_BG | AC_VO | AC_VI | AC_BE | AC_BG | |
| 0 | 1 | 0 | 0 | 0 | 1 | 0 | 0 | |

*FIG. 21*

| Multi-Link Access Category Map | | | | Single-Link Access Category Map | | | | ... |
|---|---|---|---|---|---|---|---|---|
| AC_VO | AC_VI | AC_BE | AC_BG | AC_VO | AC_VI | AC_BE | AC_BG | |
| 1 | 1 | 1 | 1 | 0 | 1 | 0 | 0 | |

*FIG. 22*

| Multi-Link Access Category Map | | | | Single-Link Access Category Map | | | | |
|---|---|---|---|---|---|---|---|---|
| AC_VO | AC_VI | AC_BE | AC_BG | AC_VO | AC_VI | AC_BE | AC_BG | ... |
| 0 | 1 | 1 | 0 | 1 | 1 | 1 | 1 | |

*FIG. 23*

| SMLO Request/Grant/Release | | | | | | | | | |
|---|---|---|---|---|---|---|---|---|---|
| Frame Control | Duration | Transmit Address | Receive Address | Direction | Application | Traffic ID | Change SMLO IE | ... | FCS |

COMMUNICATION DEVICE AND COMMUNICATION METHOD

CROSS REFERENCE TO RELATED APPLICATIONS

This application is a U.S. National Phase of International Patent Application No. PCT/JP2021/008047 filed on Mar. 3, 2021, which claims priority benefit of Japanese Patent Application No. JP 2020-046667 filed in the Japan Patent Office on Mar. 17, 2020. Each of the above-referenced applications is hereby incorporated herein by reference in its entirety.

TECHNICAL FIELD

The present technology relates to a communication device and a communication method, and more particularly to a communication device and a communication method capable of transmitting data with a shorter waiting time.

BACKGROUND ART

In a wireless local area network (LAN) system, a multi-link operation technology has been proposed as a technology for improving transmission efficiency by using a plurality of different frequency bands instead of continuous frequency channels, by which high-speed communication can be performed even if continuous frequency channels are unavailable by mutually using other frequency bands.

Patent Document 1 discloses a configuration and a control technique such that, in a wireless device capable of simultaneously transmitting a plurality of frames to the same destination by using a plurality of frequency channels, a frame in a buffer is output to a first transmission means in a case where the vacancy of the first frequency channel continues for a first period, and a frame in the buffer is output to a second transmission means in a case where the vacancy of the second frequency channel continues for a second period.

Furthermore, in a wireless LAN system, enhanced distributed channel access (EDCA) control has been employed as a data transmission control method, and a configuration in which data to be preferentially transmitted for each access category is transmitted with a short transmission waiting time has been generally used.

According to this EDCA control, the configuration has been such that a shorter transmission waiting time, arbitration inter frame spacing (AIFS), is assigned to data of an access category requiring a short latency, and a random backoff waiting time is also selected from a short range.

CITATION LIST

Patent Document

Patent Document 1: Japanese Patent Application Laid-Open No. 2010-130280

SUMMARY OF THE INVENTION

Problems to be Solved by the Invention

Incidentally, in the conventional EDCA control, since voice data is set as data with the highest priority, data that should originally be in preference cannot be transmitted preferentially, and a technology for enabling data transmission with a short waiting time has been required.

The present technology has been made in view of such a situation, and enables data to be transmitted with a shorter waiting time.

Solutions to Problems

A communication device according to one aspect of the present technology is a communication device including a control unit that sets information regarding a priority of transmission on a plurality of links for each of access categories of data in a case where data is transmitted using a plurality of links corresponding to a predetermined frequency band.

A communication method according to one aspect of the present technology includes, by a communication device, setting information regarding a priority of transmission on a plurality of links for each of access categories of data in a case where data is transmitted using a plurality of links corresponding to a predetermined frequency band.

In the communication device and the communication method according to one aspect of the present technology, information regarding a priority of transmission on a plurality of links is set for each of access categories of data in a case where data is transmitted using a plurality of links corresponding to a predetermined frequency band.

Note that the communication device of one aspect of the present technology may be an independent device or an internal block constituting one device.

BRIEF DESCRIPTION OF DRAWINGS

FIG. 10 is a diagram illustrating a configuration of an entity for transmitting and receiving signals by a plurality of links to which the present technology is applied.

FIG. 18 is a diagram illustrating an example of a configuration of a single/multi-link operation information element to which the present technology is applied.

FIG. 19 is a diagram illustrating a first example of configurations of a multi-link access category map and a single-link access category map.

FIG. 20 is a diagram illustrating a second example of configurations of the multi-link access category map and the single-link access category map.

FIG. 21 is a diagram illustrating a third example of configurations of the multi-link access category map and the single-link access category map.

FIG. 22 is a diagram illustrating a fourth example of configurations of the multi-link access category map and the single-link access category map.

FIG. 23 is a diagram illustrating an example of a configuration of a single-link/multi-link operation frame to which the present technology is applied.

MODE FOR CARRYING OUT THE INVENTION

<1. Embodiments of Present Technology>

Figure 1:
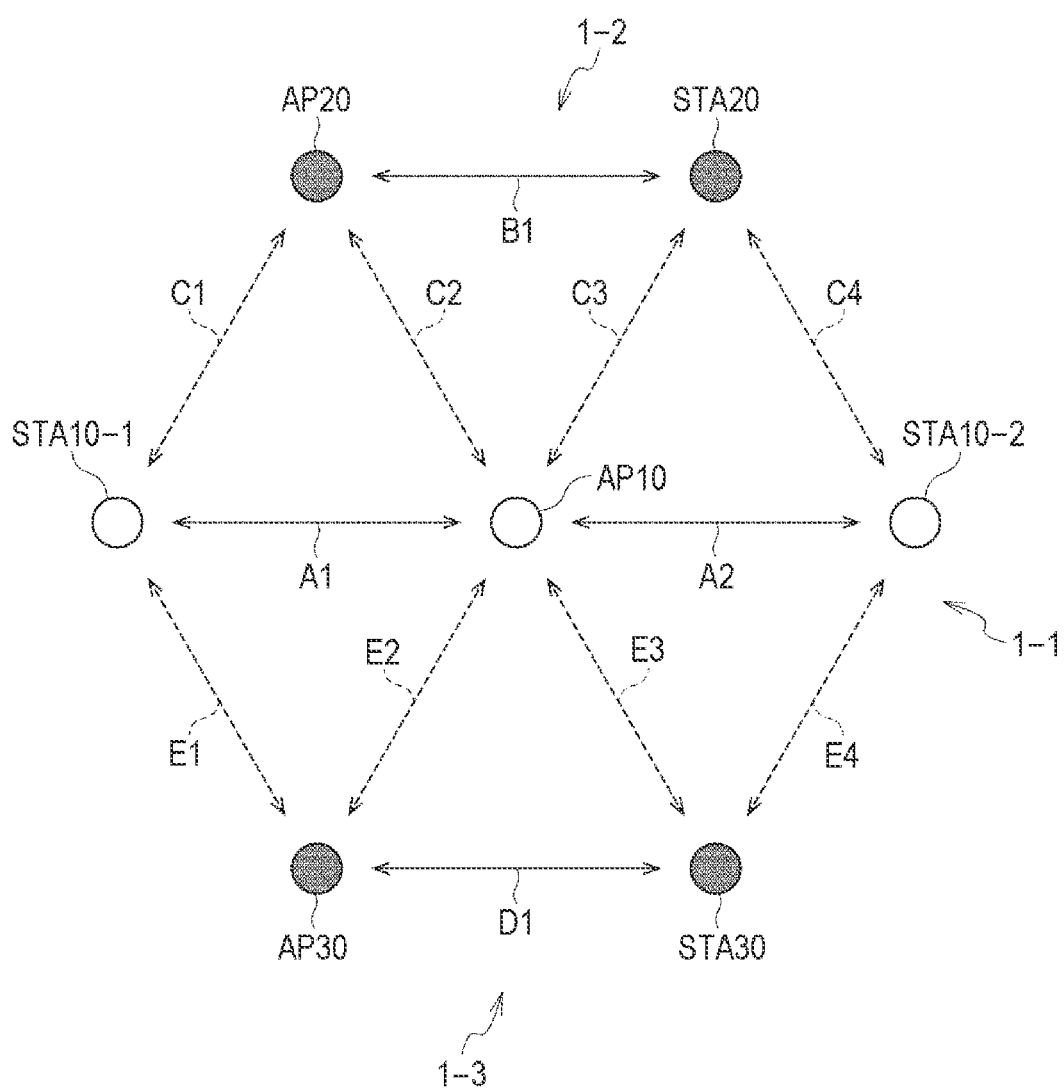
FIG. 1 is a diagram illustrating an example of a configuration of a wireless communication network by a wireless communication system to which the present technology is applied.

Conventionally, in a wireless LAN system, a channel aggregation technology of bundling and transmitting a plurality of channels (bandwidths) has been applied, and a communication method technology of bundling two channels and using a bandwidth of 40 MHz has been standardized in the IEEE 802.11n standard.

Furthermore, in the IEEE 802.11ac standard, technologies of a communication method of bundling four channels and using a bandwidth of 80 MHz and a communication method of bundling eight channels and using a bandwidth of 160 MHz have been standardized.

In these communication methods, there is a problem that a frequency channel cannot be used if the frequency channel cannot be continuously acquired, and in a space in which a large number of wireless LAN systems exists, it is difficult to perform channel aggregation of them.

In recent years, a multi-link operation technology has been proposed as a technology for improving transmission efficiency by using a plurality of different frequency bands instead of continuous frequency channels, by which high-speed communication can be performed even if continuous frequency channels are unavailable by mutually using other frequency bands.

In the technique disclosed in Patent Document 1 described above, there is disclosed a configuration and a control technique such that, in a wireless device capable of simultaneously transmitting a plurality of frames to the same destination by using a plurality of frequency channels, a frame in a buffer is output to a first transmission means in a case where the vacancy of the first frequency channel continues for a first period, and a frame in the buffer is output to a second transmission means in a case where the vacancy of the second frequency channel continues for a second period.

Moreover, in the wireless LAN system, EDCA control has been employed as a data transmission control method, and a configuration in which data to be preferentially transmitted for each access category (AC) is transmitted with a short transmission waiting time has been generally used.

According to this EDCA control, it is configured that a shorter transmission waiting time AIFS is assigned to data of an access category requiring a short latency such as voice data, and the waiting time of random backoff is also selected from a short range.

A central application at the time when these EDCA controls were standardized was a technology devised for the purpose of enabling voice of about several 10 kbps to be communicated without delay.

In recent years, in a wireless LAN system, even in a case where large-capacity video data for a real-time application is transmitted, it is required to fairly use a wireless transmission path with another wireless communication device as defined by an existing wireless communication protocol.

In particular, the IEEE 802.11 specification discloses a technique for setting a transmission waiting time on the basis of an access category (AC) of data to be transmitted by the EDCA control.

Therefore, as a next-generation technology of IEEE 802.11, there has been disclosed a technology such that these pieces of data requiring a low latency are stored in a dedicated transmission buffer, and preferentially transmitted over other data.

According to the technology disclosed in IEEE 802.11-19/1851r1, there has been disclosed a technology such that, in a case of transmission using a plurality of links, a Link Load is defined for each link, only data with a low latency is transmitted on a link with a high Link Load, and both of data with a low latency and other data are transmitted on a link with a low Link Load.

Meanwhile, in the case of multi-link operation, since frequency bands to be used are different from each other, access control of channels is performed separately, and there is a problem that a timing at which transmission can be performed simultaneously on both links (channels) is difficult to come.

Furthermore, in a case of transmitting a large amount of video data requiring a short latency, there is a problem that a transmission waiting state occurs until a time when the multi-link operation becomes possible.

In this case, if another transmission is started on the previously available link (channel) until both links (channels) become available, there is a problem that it is difficult to simultaneously transmit on both links (channels).

In particular, if a different backoff counter is set for each frequency band and the transmission waiting time is set, transmission becomes possible on one link (channel), but there have been cases where transmission cannot be performed on the other link (channel).

This is because, in the case of using the technique disclosed in Patent Document 1 described above, it is configured to transmit a frame when the waiting time of different channels expires on the first single link and the second single link, and there has been a problem that the transmission waiting times on both links are different.

That is, during the transmission on the first single link, if the second single link is arranged adjacent thereto, there is a problem that the signal transmitted on the first single link inhibits signal detection of the second single link, and the existing access control procedure cannot be applied.

On the other hand, in the existing EDCA control, by setting a predetermined transmission opportunity (TXOP), after data of an access category with a high priority is transmitted, a random backoff transmission waiting time is provided in a predetermined AIFS again, and the data of the access category cannot be transmitted unless the time elapses.

Furthermore, in a case where EDCA control is applied to each of the multi-link operations, there is still a problem that the random backoff is set again to a predetermined AIFS after data of an existing access category with a high priority is transmitted, and the data of the access category cannot be transmitted unless the time elapses.

In the existing EDCA control, since voice data is given the highest priority, voice data is transmitted in preference to video data and command data of a controller of a game device, which are currently the mainstream of application, and when voice data of another communication device is transmitted, the video data and the command data cannot be transmitted easily, and there may occur interruption of video and delay of response, which affects the user's viewing of the video and the operation of the game device.

In the technology such that data requiring a low latency is stored in a dedicated transmission buffer and preferentially transmitted over other data, a short transmission waiting time is set only for the data stored in the transmission buffer, and thus there is a problem that an opportunity to transmit data other than the data does not come.

Furthermore, data is not preferentially transmitted if it is not the data stored in the transmission buffer, and in a case where the data used in the real-time application is received, there is a problem that the data cannot be received at a desired timing unless the data is preferentially transmitted by a communication device on the transmission side.

In the technology disclosed in IEEE 802.11-19/1851r1 described above, since the Link Load is defined for each link, there remains a problem that only data with a low latency is transmitted on a link with a high Link Load, and other data cannot be transmitted.

Therefore, in the present technology, a configuration in which information regarding the priority of transmission on the multi-link and information regarding the priority of transmission on the single link are set for each data access category is proposed, and the above-described problem can be solved.

Hereinafter, embodiments of the present technology will be described with reference to the drawings.
(Configuration of Network)

FIG. 1 illustrates an example of a configuration of a wireless communication network by a wireless communication system to which the present technology is applied. Here, a configuration of a wireless LAN system is illustrated as an example of the wireless communication system.

In FIG. 1, communication devices 10 constituting a wireless LAN system 1-1 are indicated by white circles in the drawing, and solid arrows A1 and A2 in the drawing indicate that the respective communication devices 10 can communicate with an access point AP10 in a state where a communication terminal STA10-1 and a communication terminal STA10-2 are connected.

In the vicinity of the wireless LAN system 1-1, an access point AP20 and a communication terminal STA20 indicated by shaded circles in the drawing constitute another wireless LAN system 1-2, and the fact that each communication device 20 can communicate is indicated by a solid arrow B1 in the drawing.

Furthermore, in the vicinity of the wireless LAN system 1-1, an access point AP30 and a communication terminal STA30 indicated by shaded circles in the drawing further constitute another wireless LAN system 1-3, and the fact that each communication device 30 can communicate is indicated by a solid arrow D1 in the drawing.

The access point AP10 is present at a position where signals from the access point AP20 and the communication terminal STA20 and signals from the access point AP30 and the communication terminal STA30 can be received, and are represented by dashed arrows C2 and C3 and arrows E2 and E3 in the drawing.

The communication terminal STA10-1 is present at a position where it can receive signals from the access point AP20 and the access point AP30, and is represented by a dashed arrow C1 and an arrow E1 in the drawing. Furthermore, the communication terminal STA10-2 is present at a position where signals from the communication terminal STA20 and the communication terminal STA30 can be received, and is represented by a dashed arrow C4 and an arrow E4 in the drawing.

As described above, the access point AP10, the communication terminal STA10-1, and the communication terminal STA10-2 constituting the wireless LAN system 1-1 need to perform fair access between these communication devices due to the presence of the wireless LAN system 1-2 and the wireless LAN system 1-3.

Note that, hereinafter, a communication device that transmits data will be referred to as a transmission side communication device, and a communication device that receives data will be referred to as a reception side communication device. For example, in the wireless LAN system 1-1, data transmitted from a transmission side communication device 10Tx such as the access point AP10 is received by a reception side communication device 10Rx such as the communication terminal STA10-1.
(Example of Frequency Band and Channel Allocation)

Figure 2:
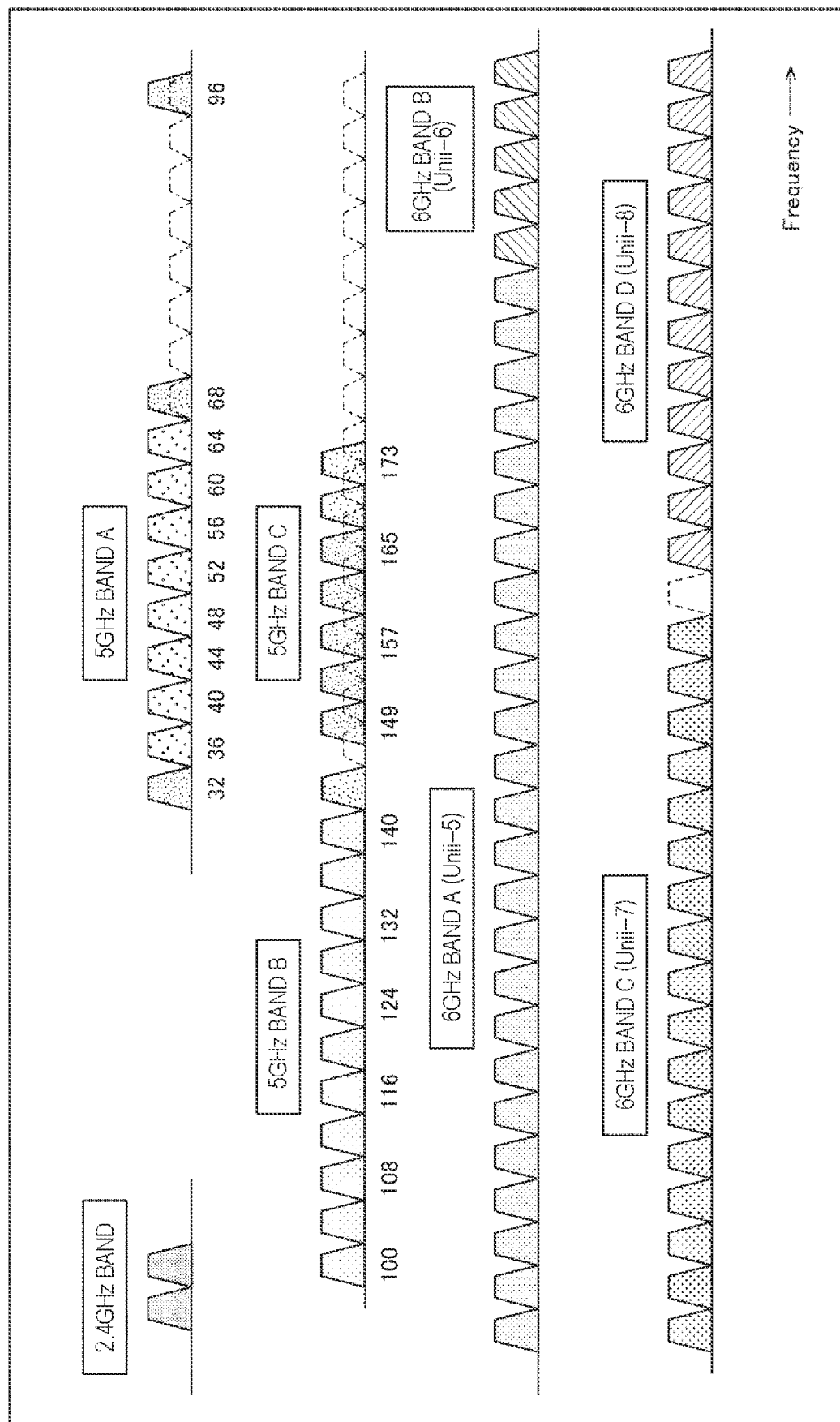
FIG. 2 is a diagram illustrating an example of frequency bands and frequency channel allocation used in a wireless communication system to which the present technology is applied.

FIG. 2 illustrates an example of frequency bands and frequency channel allocation used in a wireless communication system to which the present technology is applied.

In the 2.4 GHz band, in a case of being applied to a wireless signal of an orthogonal frequency division multiplexing (OFDM) system with 20 MHz bandwidth of the IEEE 802.11g standard, frequencies for at least two channels are set ("2.4 GHz band" in the uppermost row (first row) of FIG. 2).

In the 5 GHz band, it is possible to secure a plurality of frequency channels to be applied to a wireless signal of the OFDM system with 20 MHz bandwidth for standards such as IEEE 802.11a ("5 GHz band A, B, and C" in first and second rows of FIG. 2).

Here, the operation in the 5 GHz band is provided with an available frequency band, transmission power, and conditions for determining transmissibility according to the legal system of each country.

Channel numbers 32, 36, 40, . . . , and the like are assigned to the first and second rows of FIG. 2, and eight channels of channels 36 to 64 and 11 channels of channels 100 to 140 can be used in Japan.

Note that, in other countries and regions except for Japan, channel 32, channel 68, channel 96, and channel 144 can also be used, and further, in the frequency band thereabove, channels 149 to 173 can be used.

Furthermore, currently, 6 GHz band is being standardized as an available frequency band ("6 GHz band A, B, C, and D" in third and fourth rows of FIG. 2). As a method of using the 6 GHz band in the United States, when a frequency channel with bandwidth of 20 GHz is efficiently arranged, 25 channels can be arranged in Unii-5 band of 6 GHz band A, five channels can be arranged in Unii-6 band of 6 GHz band B, 17 channels can be arranged in Unii-7 band of 6 GHz band C, and 12 channels can be arranged in Unii-8 band of 6 GHz band D.

Figure 3:
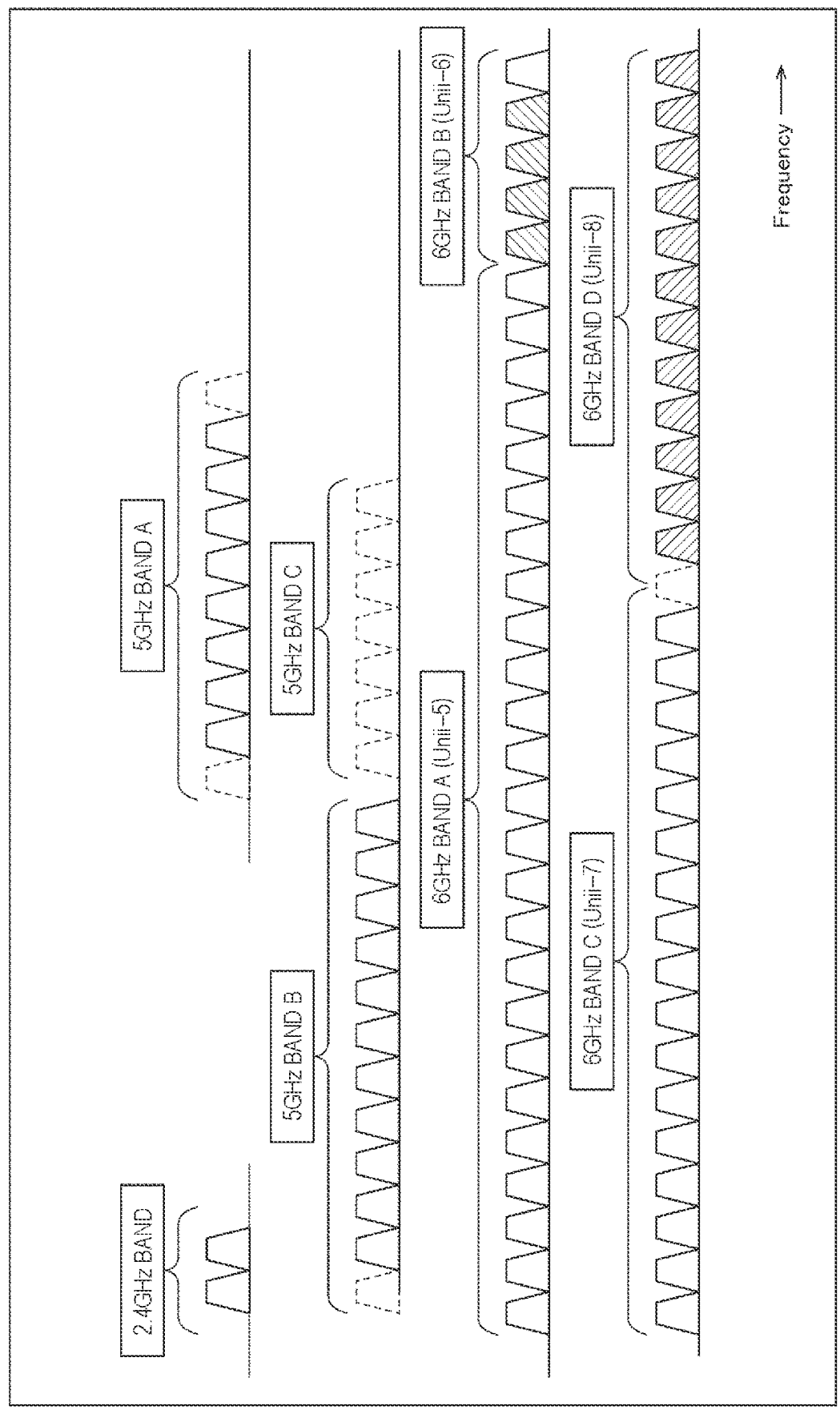
FIG. 3 is a diagram illustrating an example of a configuration in which frequency channels of predetermined bandwidths are divided and used.

FIG. 3 illustrates a configuration in which frequency channels of predetermined bandwidths are divided and used by combining freely available bands while avoiding use of bands in which use is restricted.

FIG. 3 illustrates an example in which, as the band that can be freely used, a bandwidth of 80 MHz is secured by four channels of Unii-6 band of 6 GHz band B to form a first link (Link #1), a bandwidth of 240 MHz is secured by 12 channels of Unii-8 band of 6 GHz band D to form a second link (Link #2), and these links of a plurality of bandwidths are combined to use a bandwidth of 320 MHz by the total of 16 channels.

In a case of such a use configuration of the frequency channel, there is a possibility that different systems are operated in the periphery on the first link (Link #1) and the second link (Link #2), and it is configured that the access control is individually performed in each of them.

For example, in FIG. 1, in a case where the wireless LAN system 1-1 performs communication using a plurality of links (multi-links) of the first link and the second link, when the wireless LAN system 1-2 uses the first link or when the wireless LAN system 1-3 uses the second link, it is necessary to separately perform fair access control on each of these links.

Figure 4:
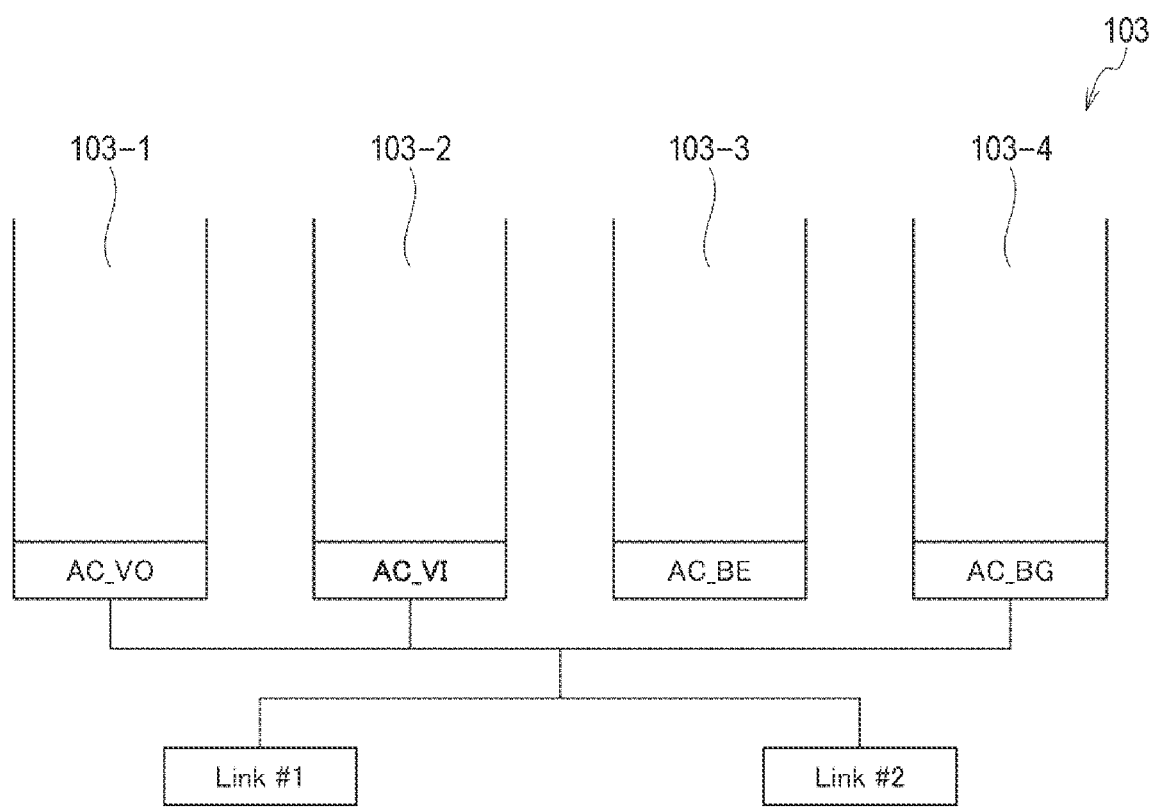
FIG. 4 is a diagram schematically illustrating a configuration for buffering data for each access category.

FIG. 4 schematically illustrates a configuration for buffering data for each access category (AC).

As illustrated in FIG. 4, in the communication device 10, a transmission buffer 103 is configured for each access category in order to perform a predetermined EDCA control defined by the IEEE 802.11 system. By performing classification using this access category, data is sequentially stored in the corresponding buffer according to the type of data, and transmission control is performed according to the priority of the data.

Here, in the EDCA control, data is classified into four access categories of AC_VO (Voice), AC_VI (Video), AC_BE (Best effort), and AC_BG (Background).

AC_VO represents a type corresponding to data requiring low delay and bandwidth guarantee, such as voice data. AC_VI represents a type corresponding to data requiring bandwidth guarantee, such as video data. AC_BE represents a type corresponding to normal data (best effort data). AC_BG represents a type corresponding to large-capacity data (background data) not limited by time.

In FIG. 4, in the transmission buffer 103, voice data is stored in an AC_VO buffer 103-1 corresponding to the access category (AC_VO), video data is stored in an AC_VI buffer 103-2 corresponding to the access category (AC_VI), best effort data is stored in an AC_BE buffer 103-3 corresponding to the access category (AC_BE), and background data is stored in an AC_BG buffer 103-4 corresponding to the access category (AC_BG).

Then, the communication device 10 is configured to transmit data in a case where the transmission waiting time and backoff time which are each defined have elapsed, and a priority order thereof is the order of AC_VO, AC_VI, AC_BE, and AC_BG. It is configured that data can be output from the transmission buffer 103 by switching between the first link (Link #1) and the second link (Link #2).

Figure 5:
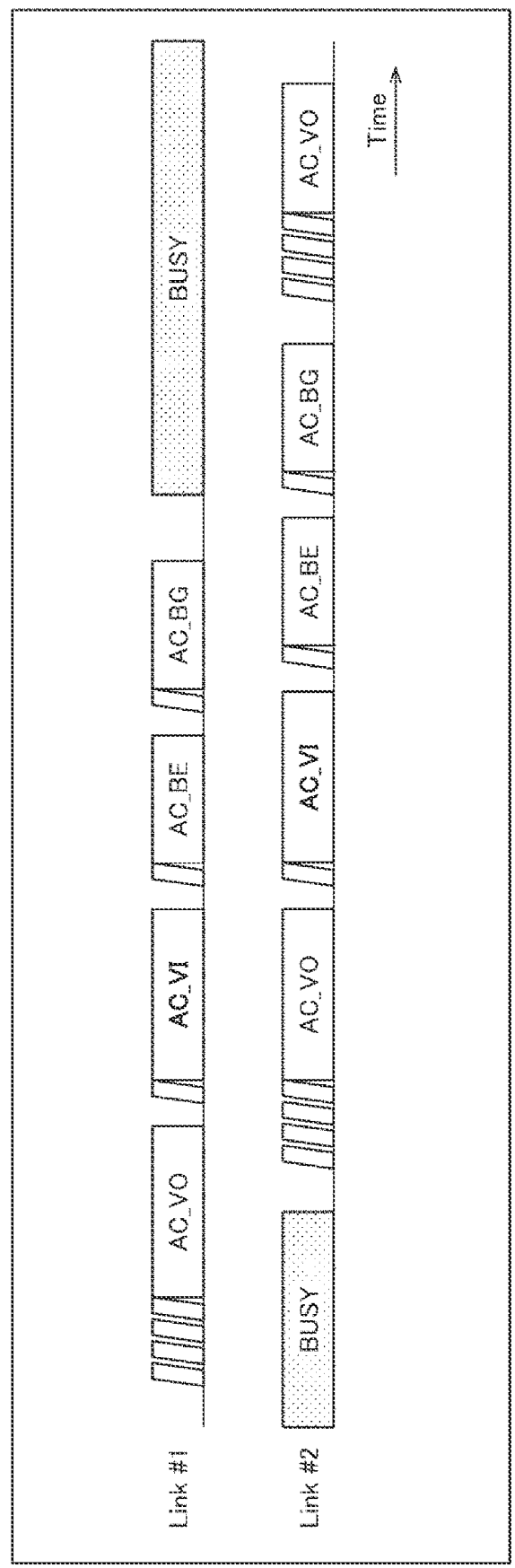
FIG. 5 is a diagram illustrating an example of transmission in a case where data is preferentially transmitted for each predetermined access category.

FIG. 5 illustrates an example of transmission in a case where data is preferentially transmitted for each predetermined access category (AC).

An upper row of FIG. 5 illustrates a flow of data on the first link (Link #1), and a lower row of FIG. 5 illustrates a flow of data on the second link (Link #2). Note that, in FIG. 5, the direction of time is a direction from left to right in the drawing.

In FIG. 5, it is configured that, in a case where the data transmission is performed using the first link and the second link, the data is sequentially transmitted in the order of AC_VO, AC_VI, AC_BE, and AC_BG according to the priority order of the access category.

Furthermore, on each link, a basic service set (BSS) network of another wireless LAN system or another wireless communication system (for example, an unlicensed network of a fifth generation wireless communication system (5G)) operates, and thus a period in which transmission cannot be performed (network allocation vector (NAV)) may be set by transmission of these other systems.

Thus, it is configured that, on the first link, as indicated by quadrangles to which AC_VO, AC_VI, AC_BE, and AC_BG are added in the drawing, after a predetermined short waiting time elapses, the voice data from the AC_VO buffer 103-1, the video data from the AC_VI buffer 103-2, the best effort data from the AC_BE buffer 103-3, and the background data from the AC_BG buffer 103-4 are sequentially transmitted.

Similarly, it is configured that, on the second link, as indicated by quadrangles to which AC_VO, AC_VI, AC_BE, and AC_BG are added in the drawing, the voice data, the video data, the best effort data, and the background data are transmitted in order after a lapse of a predetermined short waiting time.

In a case of such a configuration, in a case where a plurality of links is simultaneously transmitted, there is a problem that it is difficult to detect a reception signal on the second link in a case where transmission is performed on the first link.

Figure 6:
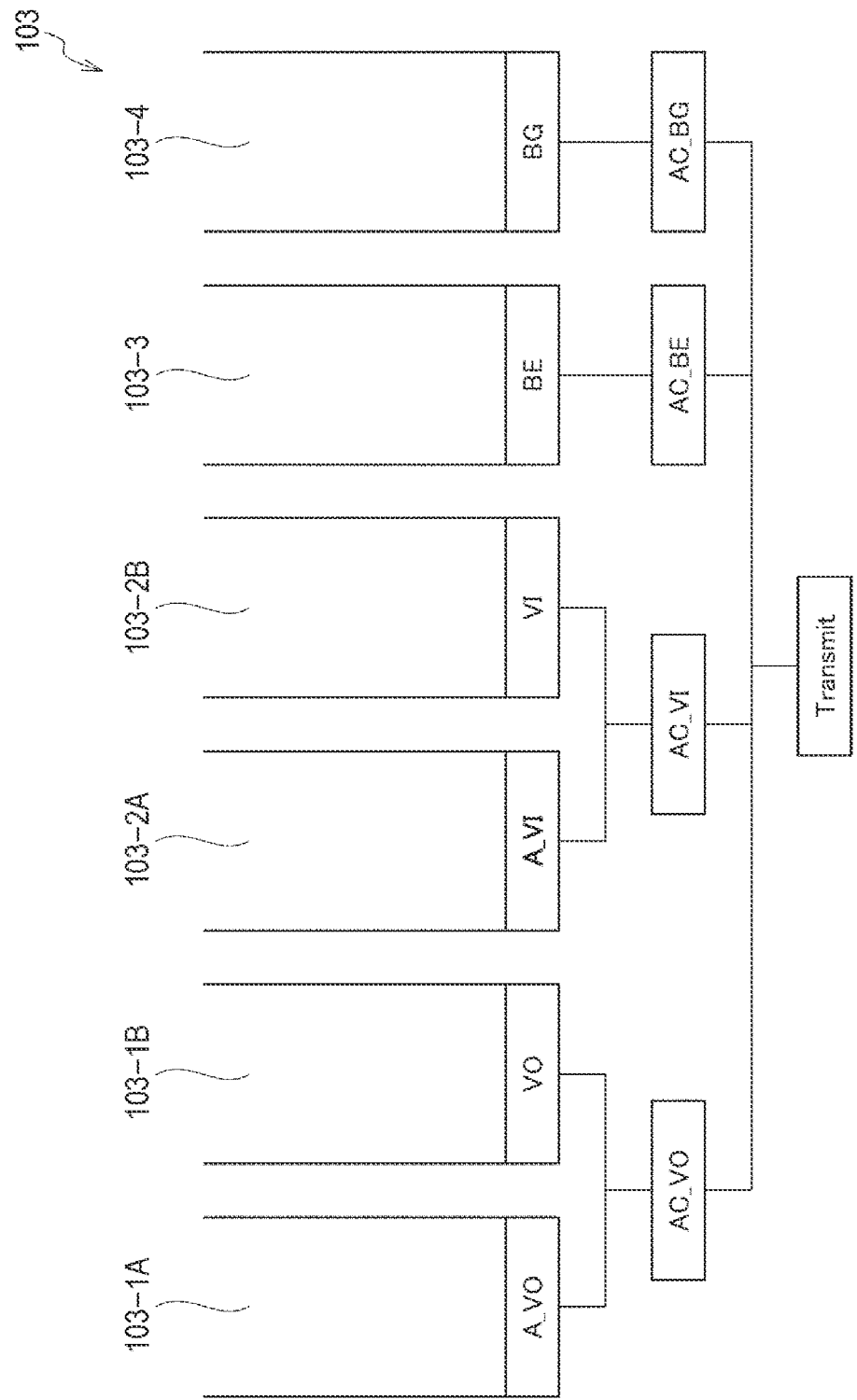
FIG. 6 is a diagram schematically illustrating a configuration in which a transmission buffer for data of a low latency request is separately provided.

FIG. 6 schematically illustrates a configuration in which a transmission buffer for data of a low latency request is separately provided.

FIG. 6 illustrates an example in which a transmission buffer for preferentially transmitting voice data and video data, which are data of a low latency request is configured for AC_VO and AC_VI among the access categories (AC). That is, it is configured that, data of each of AC_VO and AC_VI can be preferentially transmitted among the four access categories.

In AC_VO, it is configured that, according to a predetermined access control procedure, when the shortest transmission waiting time elapses, voice data stored in the A_VO buffer 103-1A is transmitted first, and then voice data stored in the VO buffer 103-1B is transmitted.

In AC_VI, it is configured that, according to the predetermined access control procedure, when the next shortest transmission waiting time elapses, video data stored in the A_VI buffer 103-2A is transmitted first, and then video data stored in the VI buffer 103-2B is transmitted.

Thereafter, in AC_BE, it is configured that, according to the predetermined access control procedure, when a predetermined transmission waiting time elapses, best effort data stored in the AC_BE buffer 103-3 is transmitted, and finally, in AC_BG, according to the predetermined access control procedure, when the longest transmission waiting time elapses, background data stored in the AC_BG buffer 103-4 is transmitted.

Figure 7:
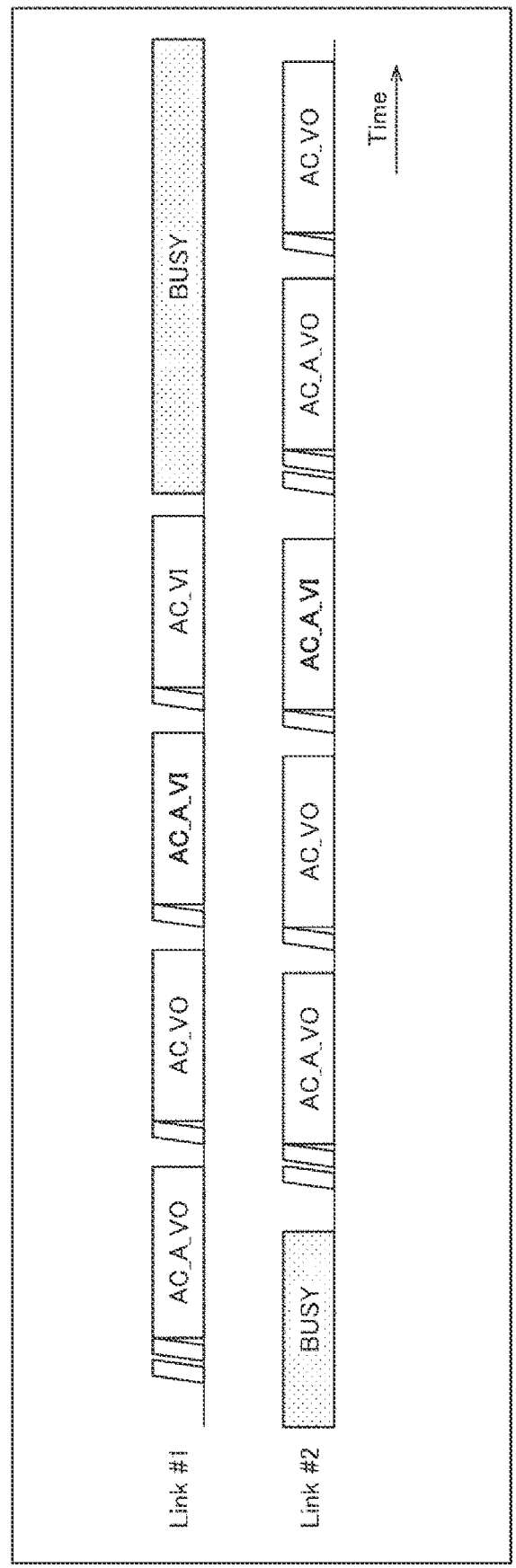
FIG. 7 is a diagram illustrating an example of transmission in a case where data is preferentially transmitted for each predetermined access category.

FIG. 7 illustrates an example of transmission in a case where data is preferentially transmitted for each predetermined access category (AC). In FIG. 7, similarly to FIG. 5, an upper row illustrates a flow of data on the first link (Link #1), and a lower row illustrates a flow of data on the second link (Link #2).

In FIG. 7, the first link is configured to transmit data according to the priority order of the existing access categories, and voice data (A_VO) of AC_A_VO is transmitted with the highest priority, then voice data (VO) of AC_VO and video data (A_VI) of AC_A_VI are transmitted, and then video data (VI) of AC_VI is transmitted. Moreover, it is configured that the best effort data of AC_BE is transmitted, and thereafter the background data of AC_BG is sequentially transmitted.

On the other hand, on the second link, the voice data (A_VO) of AC_A_VO, the voice data (VO) of AC_VO, and the video data (A_VI) of AC_A_VI are set to be preferentially transmitted. In this case, the video data (A_VI) requiring a short latency is configured to be transmitted next to the voice data (A_VO) and the voice data (VO), and there has been a case where a transmission opportunity cannot be easily obtained.

(Example of Configuration of Communication Device)

Figure 8:
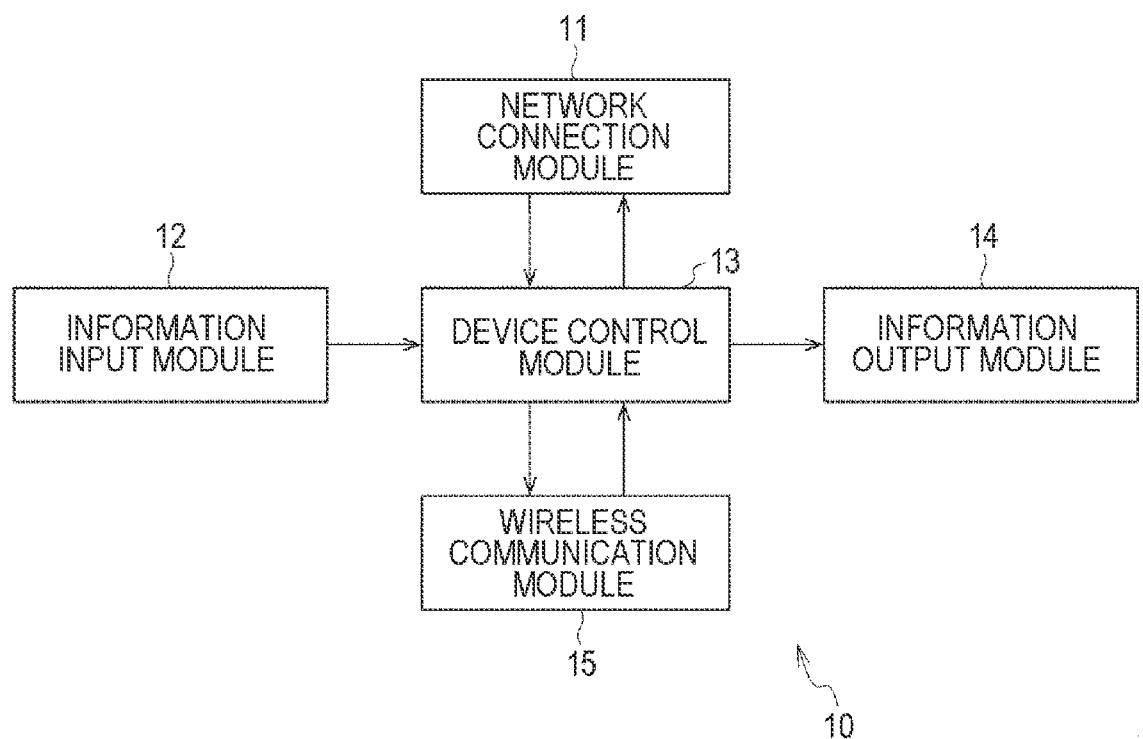
FIG. 8 is a block diagram illustrating an example of a configuration of a communication device to which the present technology is applied.

FIG. 8 illustrates an example of a configuration of a communication device to which the present technology is applied.

The communication device 10 illustrated in FIG. 8 is configured as the access point AP10 or a communication terminal STA10 in the wireless LAN system 1-1 (FIG. 1), that is, the transmission side communication device 10Tx or the reception side communication device 10Rx.

In FIG. 8, the communication device 10 includes a network connection module 11, an information input module 12, a device control module 13, an information output module 14, and a wireless communication module 15.

The network connection module 11 includes, for example, a circuit having a function of connecting from an optical fiber network or another communication line as the access point AP10 to the Internet network via a service provider, a peripheral circuit thereof, a microcontroller, a semiconductor memory, and the like.

The network connection module 11 performs various processes related to the Internet connection under the control of the device control module 13. For example, in a case where the communication device 10 operates as the access point AP10, the network connection module 11 has a configuration in which a function such as a communication modem for connecting to the Internet network is mounted.

The information input module 12 includes, for example, an input device such as a push button, a keyboard, or a touch panel. The information input module 12 has a function of inputting instruction information corresponding to an instruction from the user to the device control module 13.

The device control module 13 includes, for example, a microprocessor, a microcontroller, a semiconductor memory, and the like. The device control module 13 controls each unit (module) in order to operate the communication device 10 as the access point AP10 or the communication terminal STA10.

The device control module 13 performs various processes on information supplied from the network connection module 11, the information input module 12, or the wireless communication module 15. Furthermore, the device control module 13 supplies information obtained as a result of its own processing to the network connection module 11, the information output module 14, or the wireless communication module 15.

For example, the device control module 13 supplies transmission data passed from an application or the like of a protocol upper layer to the wireless communication module 15 at a time of data transmission, and passes reception data supplied from the wireless communication module 15 to the application or the like of the protocol upper layer at a time of data reception.

The information output module 14 includes, for example, a display element such as a liquid crystal display, an organic EL display, or a light emitting diode (LED) display, or an output device including a speaker that outputs sound or music.

The information output module 14 has a function of displaying necessary information to the user on the basis of information supplied from the device control module 13. Here, information processed by the information output module 14 includes, for example, an operating state of the communication device 10, information obtained via the Internet network, and the like.

The wireless communication module 15 includes, for example, a wireless chip, a peripheral circuit, a microcontroller, a semiconductor memory, and the like. The wireless communication module 15 performs various processes related to wireless communication under the control of the device control module 13. Details of the configuration of the wireless communication module 15 will be described later with reference to FIG. 9.

Note that, here, a wireless communication module on which a wireless communication chip, a peripheral circuit, and the like are mounted will be described as an example, but the present technology is not limited to the wireless communication module, and can be applied to, for example, a wireless communication chip, a wireless communication LSI, and the like. Moreover, in the wireless communication module, whether to include an antenna is optional.

Furthermore, in the communication device 10 of FIG. 8, the device control module 13 and the wireless communication module 15 are necessary components, but whether the network connection module 11, the information input module 12, and the information output module 14 excluding them are included in the components is optional.

That is, each of the communication devices 10 operating as the access point AP10 or the communication terminal STA10 can be configured by only necessary modules, and unnecessary portions can be simplified or not incorporated.

More specifically, for example, the network connection module 11 can be incorporated only in the access point AP10, and the information input module 12 and the information output module 14 can be incorporated only in the communication terminal STA10.

(Example of Configuration of Wireless Communication Module)

Figure 9:
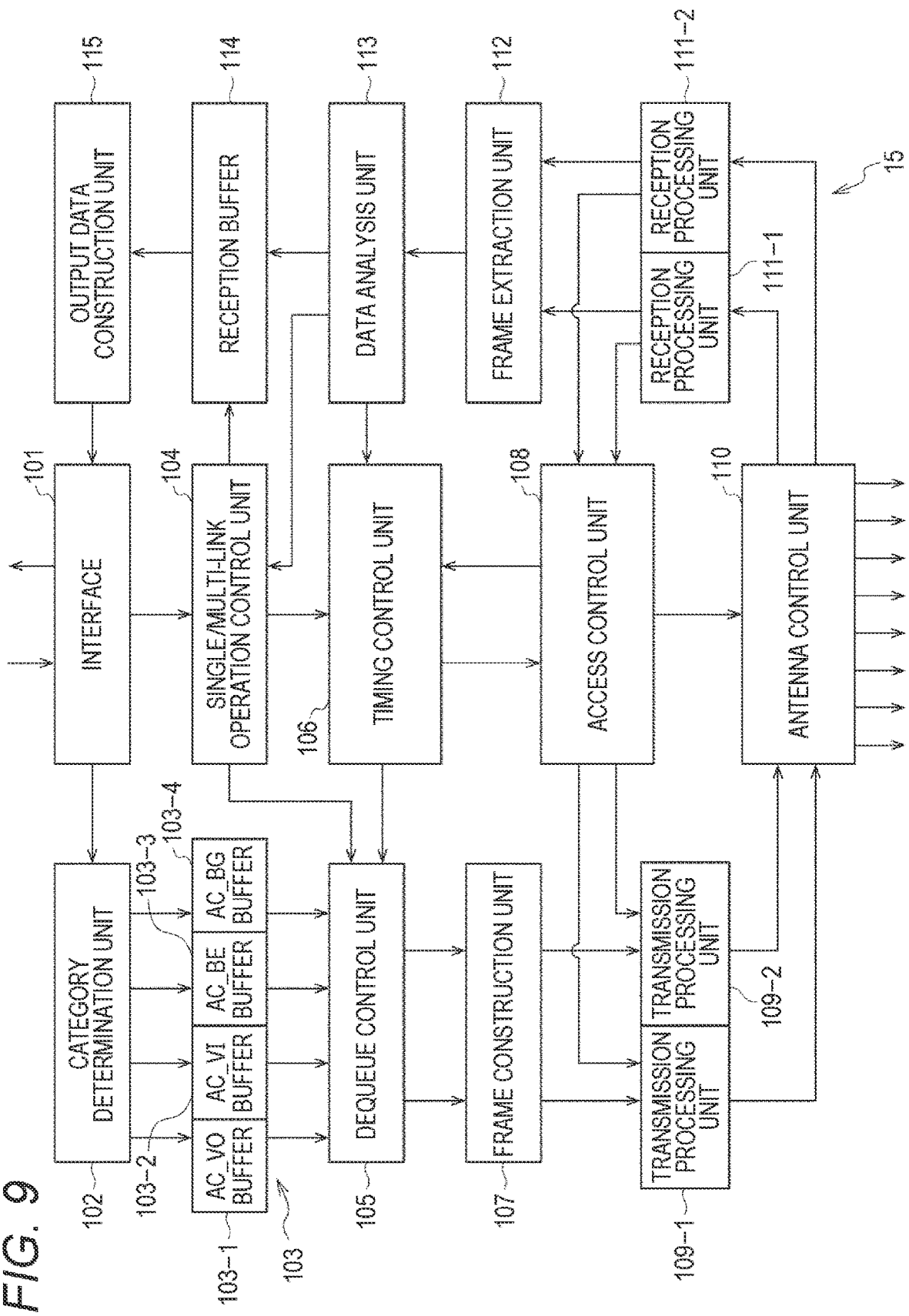
FIG. 9 is a block diagram illustrating an example of a configuration of a wireless communication module of FIG. 8.

FIG. 9 illustrates an example of a configuration of the wireless communication module 15 of FIG. 8.

The wireless communication module 15 is connected to another module and includes an interface 101 that exchanges various types of information and data with the outside, a category determination unit 102 that determines an attribute of transmission data from an access category, and the transmission buffer 103 that temporarily stores transmission data for each access category.

The transmission buffer 103 includes the AC_VO buffer 103-1 that stores voice data, the AC_VI buffer 103-2 that stores video data, the AC_BE buffer 103-3 that stores best effort data, and the AC_BG buffer 103-4 that stores background data.

This configuration includes a single/multi-link operation control unit 104 that controls operations of the single link and the multi-link, which are characteristic functions of the present technology, a dequeue control unit 105 that dequeues an order of transmission data, a timing control unit 106 that controls a transmission timing, a frame construction unit 107 that constructs a data frame to be transmitted, an access control unit 108 that controls transmission and reception of data, and transmission processing units 109-1 and 109-2 that perform a transmission operation on respective links.

The transmission processing unit 109-1 performs a transmission operation related to the first link (Link #1). The transmission processing unit 109-2 performs a transmission operation related to the second link (Link #2). An antenna control unit 110 that performs control to transmit a transmission signal thereto from an antenna (not illustrated) and receive a signal transmitted from another communication device via the antenna is provided. Note that a configuration in which the antenna control unit 110 is not included in the wireless communication module 15 may be employed.

On the other hand, the wireless communication module 15 includes reception processing units 111-1 and 111-2 that perform a reception operation using a signal received by the antenna on each link as a predetermined signal. The reception processing unit 111-1 performs a reception operation related to the first link (Link #1). The reception processing unit 111-2 performs a reception operation related to the second link (Link #2).

Furthermore, a frame extraction unit 112 that extracts a predetermined data frame from a reception signal, a data analysis unit 113 that analyzes data included in a received frame, and a reception buffer 114 that temporarily stores received data are included. Moreover, an output data construction unit 115 is included that, in order to deliver data to a predetermined application, constructs the data in an output format thereof, and it is configured that the data is finally delivered to the application of the connected device via the interface 101.

Note that, in FIG. 9, each arrow among blocks represents a flow or control of data (signal), and each block operates in cooperation with another block connected by an arrow in order to implement its own function.

That is, for example, the single/multi-link operation control unit 104 operates in cooperation with each of the interface 101, the dequeue control unit 105, the timing control unit 106, the data analysis unit 113, and the reception buffer 114 in order to implement a function of controlling operations of the single link and the multi-link as a characteristic function of the present technology.

Furthermore, for example, the access control unit 108 operates in cooperation with each of the timing control unit 106, the transmission processing units 109-1 and 109-2, the antenna control unit 110, and the reception processing units 111-1 and 111-2 in order to implement a function of controlling transmission and reception of data corresponding to operations of the single link and the multi-link as a characteristic function of the present technology.

In the wireless communication module 15 configured as described above, in particular, the following processing is performed, for example, by the single/multi-link operation control unit 104 controlling the operation of each unit.

That is, in the wireless communication module 15 of the communication device 10 (the transmission side communication device 10Tx or the reception side communication device 10Rx), in a case where data is transmitted by the single/multi-link operation control unit 104 or the like using a plurality of links (for example, Link #1 and Link #2) corresponding to a predetermined frequency band (in a case where transmission is performed on the multi-link), information regarding a priority of transmission on a plurality of links (multi-link) (for example, information indicating the possibility of transmission) is set for each access category (for example, AC_VO, AC_VI, AC_BE, and AC_BG) of data.

Furthermore, in the wireless communication module 15, the information regarding the priority of transmission on one link (single link) (for example, information indicating the possibility of transmission) is set for each access category (for example, AC_VO, AC_VI, AC_BE, and AC_BG) by the single/multi-link operation control unit 104 or the like.

(Configuration of Entity)

FIG. 10 illustrates a configuration of an entity for transmitting and receiving signals by a plurality of links as an entity to which the present technology is applied.

FIG. 10 schematically illustrates a configuration as a subject of processing in a case of managing transmission and reception of data on a plurality of links including the first link (Link #1) and the second link (Link #2).

In FIG. 10, a station management entity of each link exists in each of a PHY layer and its management entity on each link and a MAC sublayer and its management entity. Then, it is indicated that control of data transmission/reception on the single link and control of data transmission/reception on the multi-link can be implemented by connecting these by a multi-link management entity.

With this configuration, it is possible to perform control in a case where the first link and the second link operate as multi-links in addition to a state where the first link and the second link operate as different links at present.

First Example

Figure 11:
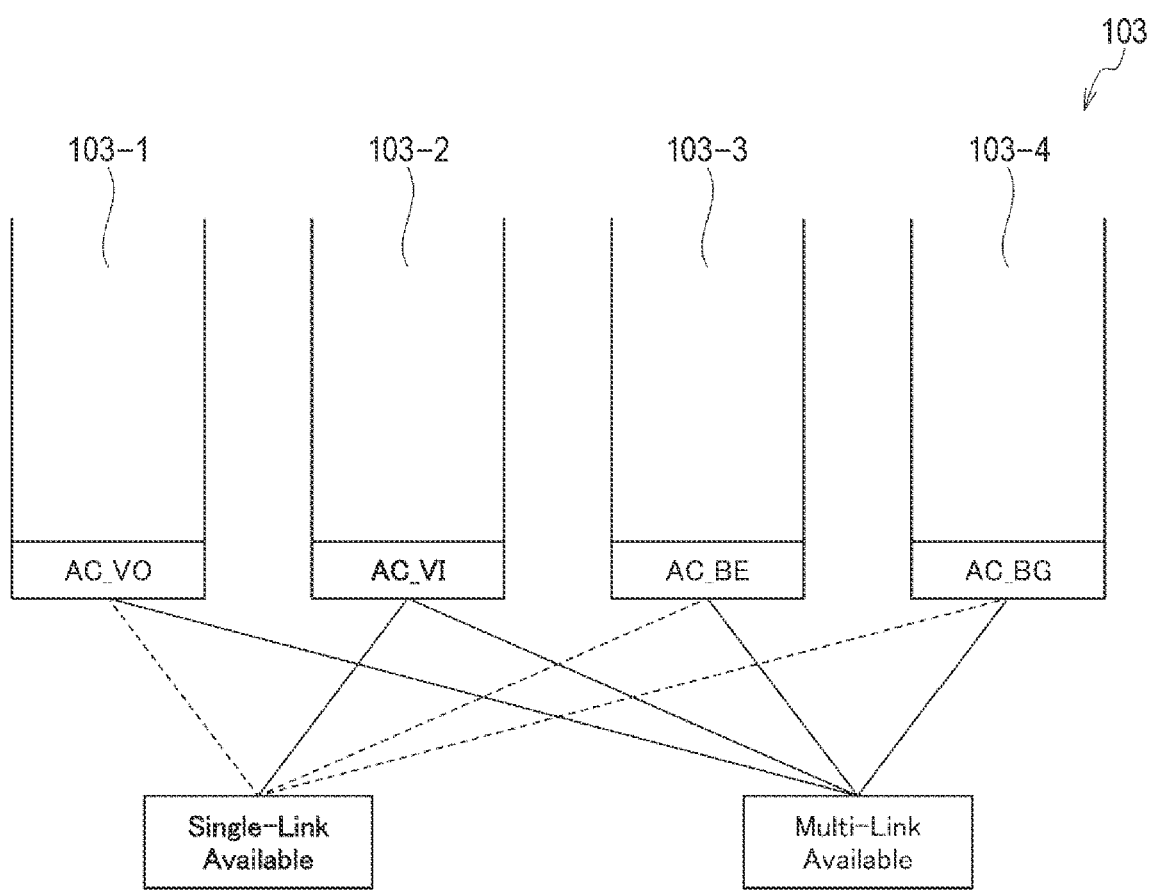
FIG. 11 is a diagram illustrating a first example of buffer control on a single link and a multi-link according to the present technology.

FIG. 11 illustrates a first example of buffer control on the single link and the multi-link according to the present technology.

As illustrated in FIG. 11, the transmission buffer 103 has a buffer configuration of an access category (AC_VO, AC_VI, AC_BE, and AC_BG), and includes a "Single-Link Available" portion that performs dequeue control in a case where a transmission path becomes available on the single link of one of a plurality of links, and a "Multi-Link Available" portion that performs dequeue control in a case where a transmission path becomes available on the multi-link of both.

That is, in the configuration of FIG. 11, it is schematically illustrated that there are virtual output configurations from the transmission buffers of the respective access categories to each of the "Single-Link Available" portion and the "Multi-Link Available" portion. In a case where the transmission control is performed in the priority order of the existing access categories, all output configurations of both the single link and the multi-link are fairly connected.

Here, for example, in a case where data of a request for a latency shorter than a predetermined period is stored in the access category (AC_VI), or in a case where an application using such data is activated, setting is performed such that the single link only and the access category (AC_VI) only are enabled, and the other access categories (AC_VO, AC_BE, and AC_BG) are disabled.

That is, as indicated by solid lines in the drawing, data of all access categories is transmitted on the multi-link, but on the single link, it is configured to only transmit video data of AC_VI.

Moreover, as indicated by dashed lines in the drawing, a configuration is illustrated in which data output is controlled by virtually creating a state where data of the access categories (AC_VO, AC_BE, and AC_BG) other than AC_VI is not sent on the single link.

Figure 12:
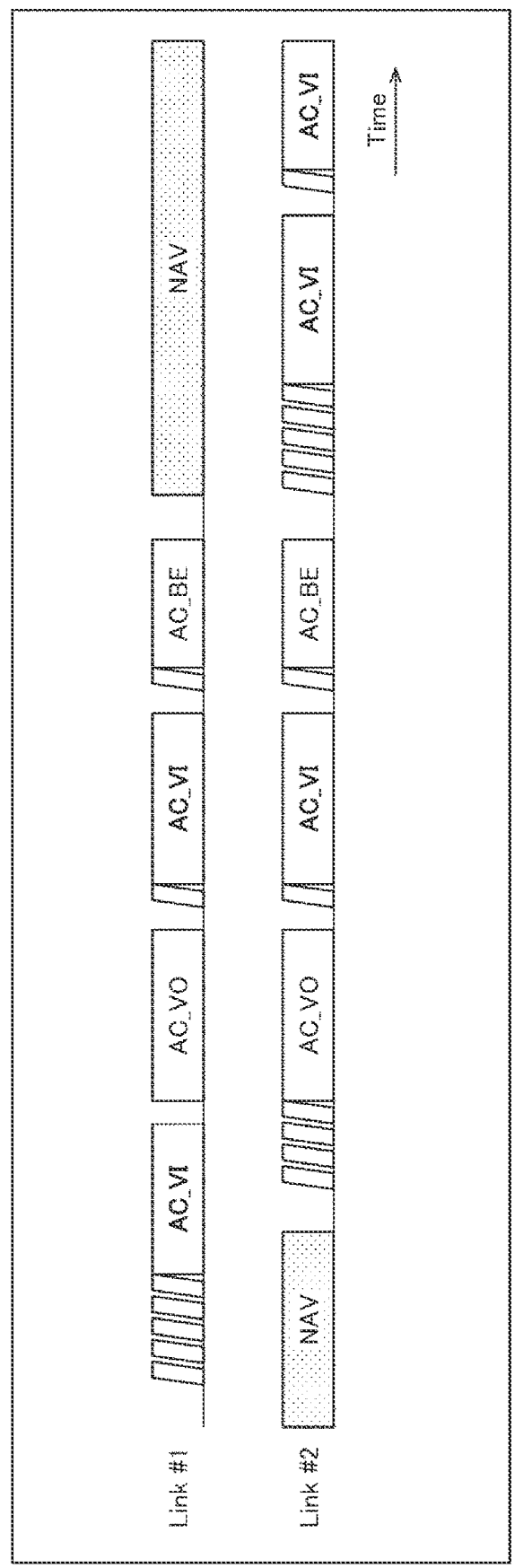
FIG. 12 is a diagram illustrating a first example of data output for each access category according to the present technology.

FIG. 12 illustrates a first example of data output for each access category according to the present technology.

FIG. 12 illustrates a case where control is performed such that, in a case where the above-described transmission control in FIG. 11 is performed, the video data of the access category (AC_VI) is transmitted on the single link, and transmission of data of other access categories is refrained on the single link.

Also in FIG. 12, similarly to the above-described case, an upper row illustrates a flow of data on the first link (Link #1), and a lower row illustrates a flow of data on the second link (Link #2).

That is, in a case where only the first link (Link #1) is available at a time when the second link (Link #2) is used in another system, the transmission control to transmit the video data of AC_VI is performed. Furthermore, an example is illustrated in which transmission control of performing transmission according to priorities of the existing access categories (AC_VO, AC_VI, AC_BE, and AC_BG) is performed in a case where the first link (Link #1) and the second link (Link #2) are available.

Moreover, the example illustrates a state in which the video data of AC_VI is transmitted also when only the second link (Link #2) is available while the first link (Link #1) is used in another system. Thus, it is configured that the video data of AC_VI set for transmission on the single link is transmitted more frequently than data of the other access categories.

Second Example

Figure 13:
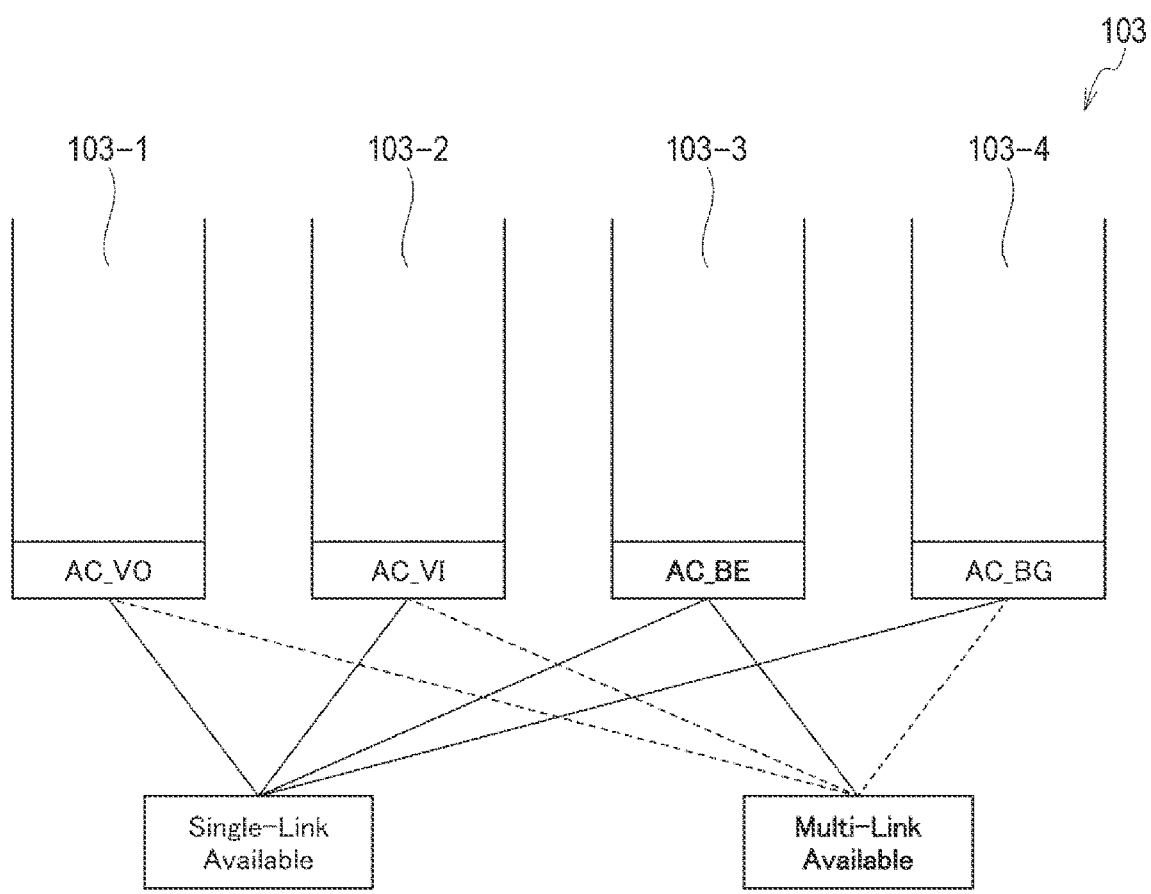
FIG. 13 is a diagram illustrating a second example of the buffer control on the single link and the multi-link according to the present technology.

FIG. 13 illustrates a second example of buffer control on the single link and the multi-link according to the present technology.

In the configuration of FIG. 13, similarly to the configuration of FIG. 11, it is schematically illustrated that there are virtual output configurations from the buffers of the respective access categories in the transmission buffer 103 to each of the "Single-Link Available" portion and the "Multi-Link Available" portion.

Here, for example, in a case where data of a request for a latency shorter than a predetermined period is stored in the access category (AC_BE), or in a case where an application using such data is activated, setting is performed such that only the access category (AC_BE) is enabled and the other access categories (AC_VO, AC_VI, AC_BG) are disabled on the multi-link.

That is, as indicated by a solid line in the drawing, it is configured to transmit data of all access categories on the single link, but only the best effort data of AC_BE is transmitted on the multi-link.

Moreover, as indicated by dashed lines in the drawing, a configuration is illustrated in which data output is controlled by virtually creating a state where data of the access categories (AC_VO, AC_VI, and AC_BG) other than AC_BE is not sent on the multi-link.

Figure 14:
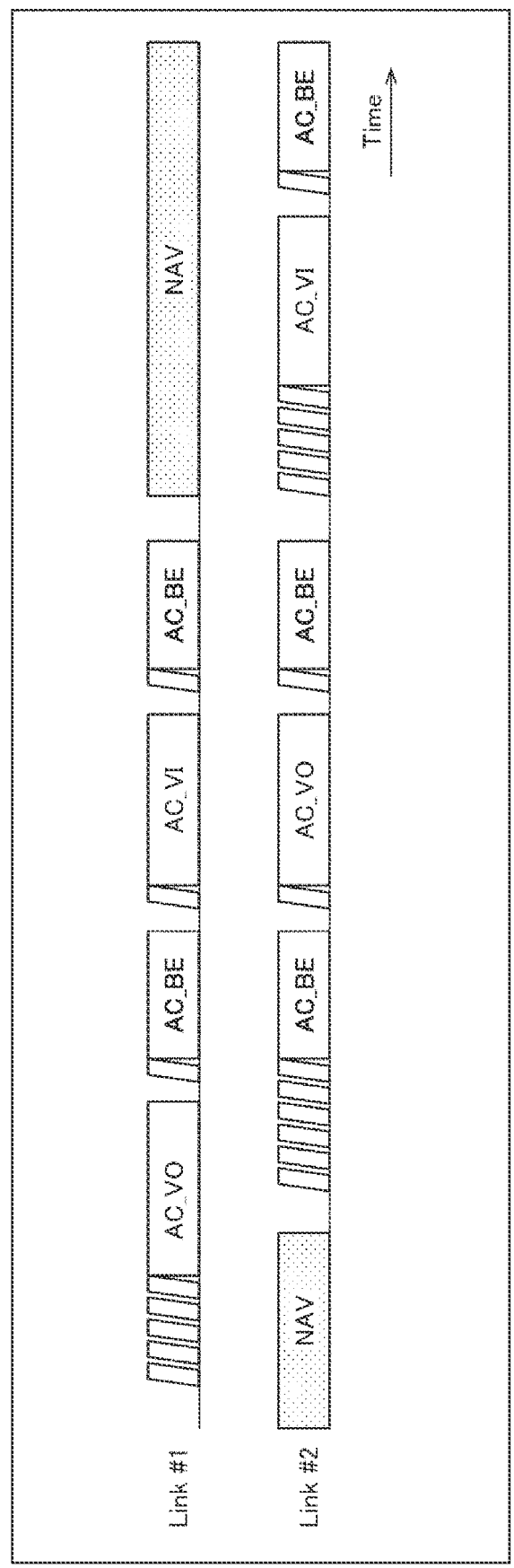
FIG. 14 is a diagram illustrating a second example of data output for each access category according to the present technology.

FIG. 14 illustrates a second example of data output for each access category according to the present technology.

FIG. 14 illustrates a case where control is performed such that, in a case where the above-described transmission control in FIG. 13 is performed, the best effort data of the access category (AC_BE) is preferentially transmitted on the multi-link, and data of other access categories is transmitted on the multi-link in a case where the data does not exist.

Also in FIG. 14, similarly to the above-described case, an upper row illustrates a flow of data on the first link (Link #1), and a lower row illustrates a flow of data on the second link (Link #2).

That is, in a case where only the first link (Link #1) is available while the second link (Link #2) is used in another system, the voice data of AC_VO is transmitted, and in a case where the multi-link of the first link (Link #1) and the second link (Link #2) is available, the best effort data of AC_BE is preferentially transmitted. Then, an example is illustrated in which, in a case where the best effort data of AC_BE has been transmitted, control of transmitting the data of AC_VO and AC_VI on the multi-link is performed according to the priorities of the existing access categories.

Moreover, the example illustrates a state in which the best effort data of AC_BE is transmitted also when only the second link (Link #2) is available while the first link (Link #1) is used in another system. Thus, the best effort data of AC_BE for which the transmission setting on the multi-link is made is configured to be transmitted more frequently than the data of other access categories.

(Example of Sequence)

Figure 15:
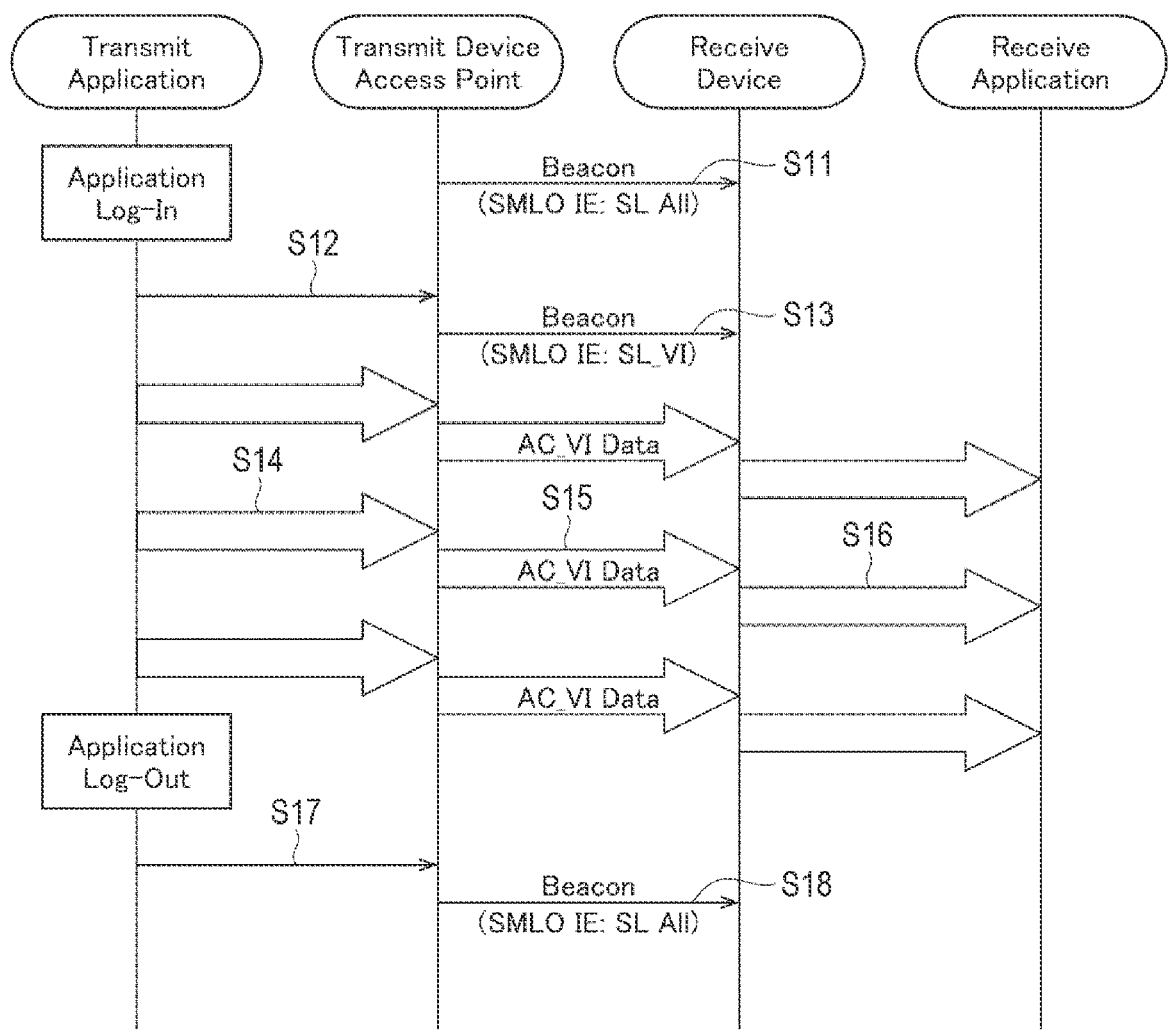
FIG. 15 is a diagram illustrating a sequence of transmission buffer control by a transmission side application.

FIG. 15 illustrates a sequence of transmission buffer control by a transmission side application.

In FIG. 15, a sequence in which the transmission side application (Transmit Application) and a transmission side communication device (Transmit Device) 10Tx deliver video data to a reception side communication device (Receive Device) 10Rx and a reception side application (Receive Application) in real time is assumed.

Here, in a case where the transmission side communication device 10Tx operates as, for example, an access point AP, it is assumed that a single/multi-link operation information element (SMLO IE) to which the present technology is applied is added to a predetermined beacon signal (S11).

First, in a case where an application for distributing real-time video data is activated by the transmission side application, a notification is given of parameter information such as latency information, a transmission information amount, and a throughput related to the real-time data transmission (S12).

In a case where the transmission side communication device 10Tx grasps that the real-time video data is transmitted from these pieces of parameter information, the transmission side communication device 10Tx determines whether to change the setting of the data transmission on the single-link operation and the multi-link operation as necessary with reference to the environment of the surrounding network.

Here, in a case where it is assumed that there are other systems in the surroundings and there are many timings at which the single-link operation is performed, it is set that the video data of the access category (AC_VI) is preferentially transmitted by the single-link operation for the real-time video data, the setting is changed in the single/multi-link operation information element (SMLO IE) and added to the beacon signal, and the reception side communication device 10Rx is notified of the beacon signal (S13).

Then, in a case where the video data is transmitted from the transmission side application, the transmission side communication device 10Tx stores the video data in the AC_VI buffer 103-2, and preferentially transmits the video data on the single link over data of other access categories (S14 and S15). Thus, the reception side communication device 10Rx can receive the video data and deliver real-time video data to the reception side application (S16).

Moreover, in a case where the application for distributing the real-time video data has ended in the transmission side application, a notification of the end is given (S17). The transmission side communication device 10Tx determines that it is no longer necessary to preferentially transmit the data of the access category (AC_VO), and determines to return the setting so as to transmit all the data on the basis of the priority order of the existing access categories. Then, the transmission side communication device 10Tx is configured to return the single/multi-link operation information element (SMLO IE) to the initial state and perform notification by the beacon signal (S18).

Figure 16:
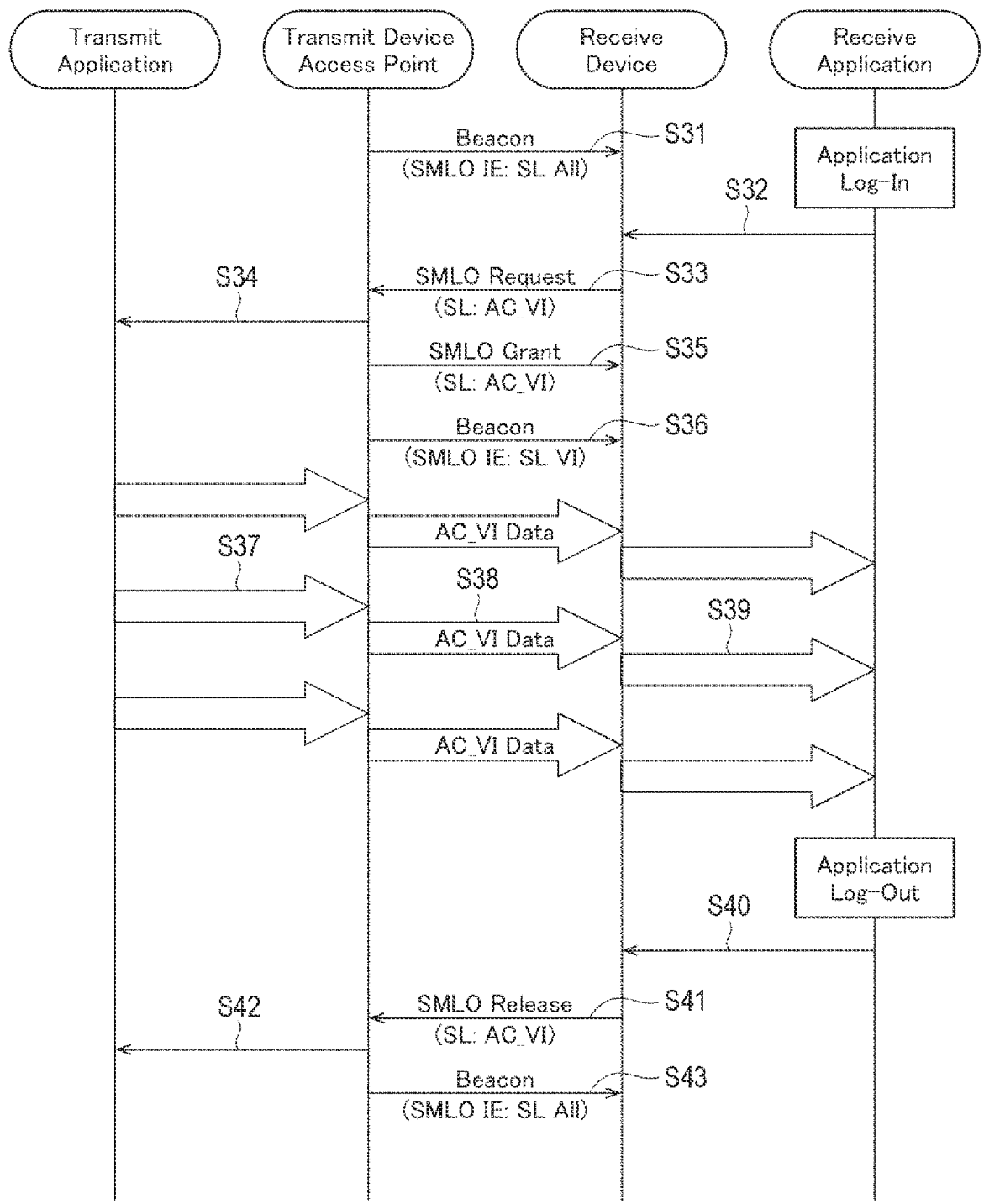
FIG. 16 is a diagram illustrating a sequence of transmission buffer control by a reception side application.

FIG. 16 illustrates a sequence of transmission buffer control by the reception side application.

In FIG. 16, a sequence in which the transmission side application (Transmit Application) and the transmission side communication device (Transmit Device) 10Tx deliver video data to the reception side communication device (Receive Device) 10Rx and the reception side application (Receive Application) in real time is assumed.

Here, in a case where the transmission side communication device 10Tx operates as, for example, an access point AP, it is assumed that a single/multi-link operation information element (SMLO IE) to which the present technology is applied is added to a predetermined beacon signal (S31).

First, in a case where an application for distributing the real-time video data is activated by the reception side application, the reception side communication device 10Rx acquires the parameter information such as the latency information, the transmission information amount, and the throughput related to the real-time data transmission, and generates the parameter information as a request frame (S32). A notification of this request frame (SMLO Request) is given to the transmission side communication device 10Tx or the transmission side application as the transmission source of data (S33 and S34).

In a case of receiving the request frame, when the transmission side communication device 10Tx grasps that the real-time video data is transmitted from these pieces of parameter information, the transmission side communication device 10Tx determines whether to change the setting of data transmission on the single-link operation and the multi-link operation as necessary with reference to the environment of the surrounding network. Then, in a case where it is determined that this setting is possible, a grant frame (SMLO Grant) is transmitted toward the reception side communication device 10Rx (S35).

Moreover, the transmission side communication device 10Tx is set to preferentially transmit the data of the access category (AC_VI) for the real-time video data by the single-link operation, and the setting is changed in the single/multi-link operation information element (SMLO IE) and added to the beacon signal, and the reception side communication device 10Rx is notified of the beacon signal (S36).

Then, in a case where the video data is transmitted from the transmission side application, the transmission side communication device 10Tx stores the video data in the AC_VI buffer 103-2, and preferentially transmits the video data on the single link over data of other access categories (S37 and S38). Thus, the reception side communication device 10Rx can receive the video data and deliver real-time video data to the reception side application (S39).

Moreover, in a case where the application for distributing the real-time video data has ended in the reception side application, a notification of the end is given (S40). Then, the reception side communication device 10Rx is configured to generate and transmit a release frame (SMLO Release) to the transmission side communication device 10Tx in response to the notification from the reception side application (S41).

In a case where a notification of the release frame is given, the transmission side communication device 10Tx determines that it is no longer necessary to preferentially transmit the data of the access category (AC_VI), and performs processing for returning the setting so as to transmit all the data on the basis of the priority order of the existing access categories (so as to be performed fairly). Then, the transmission side communication device 10Tx is configured to return the single/multi-link operation information element (SMLO IE) to the initial state and a notification is given by the beacon signal (S42 and S43).

Figure 17:
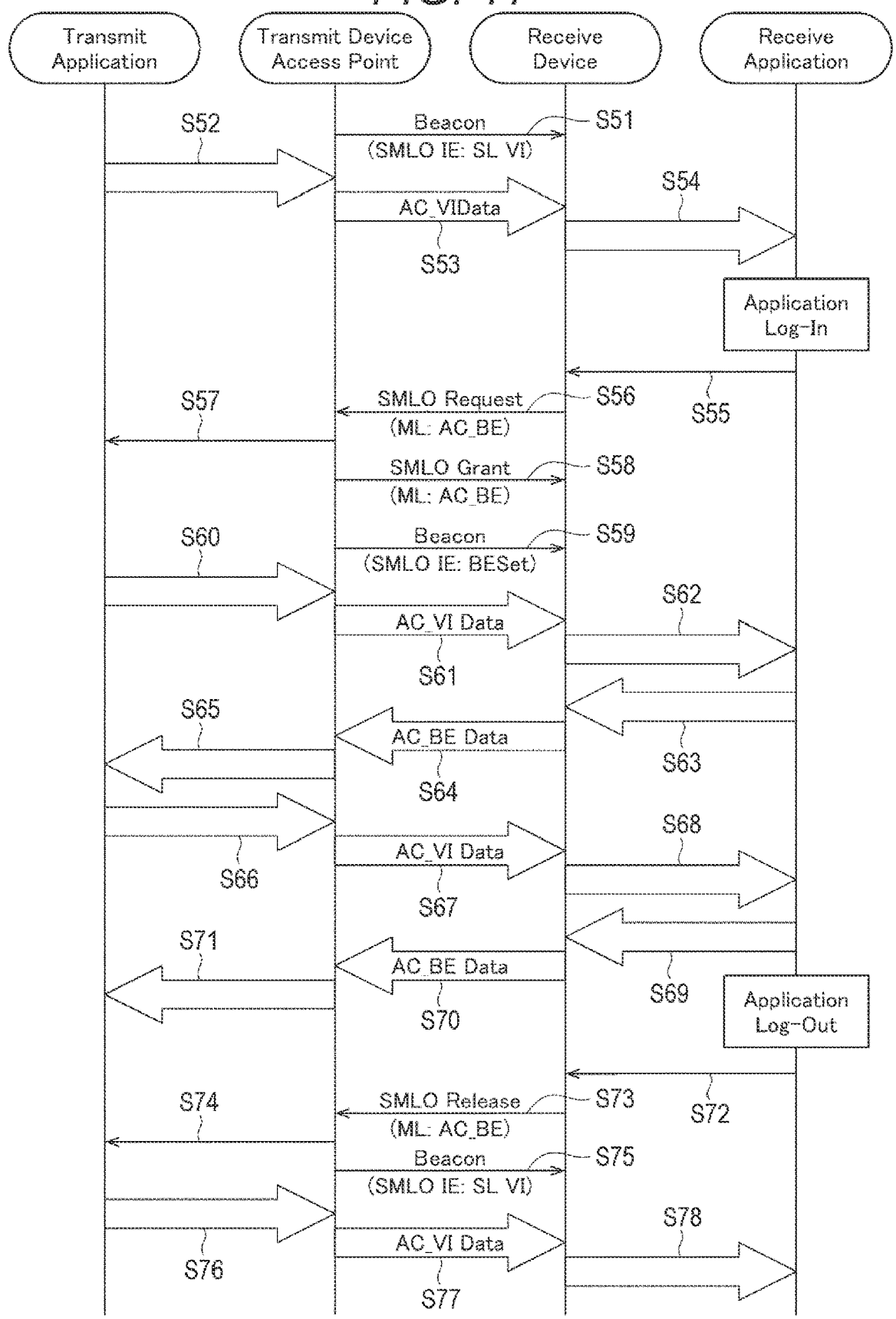
FIG. 17 is a diagram illustrating a sequence of control for performing bidirectional transmission in the reception side application.

FIG. 17 illustrates a sequence of control for performing bidirectional transmission in the reception side application.

FIG. 17 illustrates a configuration in which, in a case where a setting for transmitting real-time video data is made to the reception side application, a setting change for transmitting command data or the like that needs to be transmitted with a latency shorter than a predetermined period is performed also from the reception side.

Note that in the transmission side communication device 10Tx, the video data of the access category (AC_VI) is set to be preferentially transmitted by the single-link operation, and the reception side communication device 10Rx is notified of the beacon signal to which the single/multi-link operation information element (SMLO IE) in which the setting is described is added (S51). Thus, in the transmission side communication device 10Tx, the video data from the transmission side application can be preferentially transmitted on the single link over data of other access categories (S52 to S54).

Here, in a case where an application for communicating command data such as the game device is activated by the reception side application, the reception side communication device 10Rx acquires the parameter information such as the latency information, the transmission information amount, and the throughput from allowable delay information related to transmission of the command data, and generates the parameter information as the request frame (S55). The transmission side communication device 10Tx or the transmission side application as the transmission source of data is notified of this request frame (SMLO Request) (S56 and S57).

In a case of receiving the request frame, when the transmission side communication device 10Tx grasps that real-time command data is transmitted from these pieces of parameter information, the transmission side communication device 10Tx determines whether to change the setting of data transmission by the single-link operation and the multi-link operation as necessary with reference to the environment of the surrounding network. Then, in a case where it is determined that this setting is possible, a grant frame (SMLO Grant) is transmitted toward the reception side communication device 10Rx (S58).

Here, in a case where it is assumed that there are no other systems around and there are many timings at which the multi-link operation is performed, the transmission side communication device 10Tx is set to preferentially transmit the best effort data of the access category (AC_BE) by the multi-link operation for transmission of the real-time command data, the setting is changed in the single/multi-link operation information element (SMLO IE) and added to the beacon signal, and the reception side communication device 10Rx is notified of the beacon signal (S59).

In a case where video data is transmitted from the transmission side application, the transmission side communication device 10Tx stores the video data in the AC_VI buffer 103-2, and preferentially transmits the video data on the single link over data of other access categories (S60 and S61). Thus, the reception side communication device 10Rx can receive the video data and deliver real-time video data to the reception side application (S62). Thus, control is performed in such a manner that transmission on a plurality of links or one link is enabled in the access category in which specific data exists, and fair transmission is controlled in other access categories.

On the other hand, in a case where the command data is transmitted from the reception side application, the reception side communication device 10Rx stores the command data in the AC_BE buffer 103-3 as best effort data, and preferentially transmits the command data on the multi-link over data of other access categories (S63 and S64). Thus, the reception side communication device 10Rx can preferentially transmit the command data in a short response time while receiving the real-time video data.

In a case of receiving the command data, the transmission side communication device 10Tx performs processing corresponding to the command data. For example, the transmission side communication device 10Tx performs a process of transmitting video data corresponding to the command data (S65 to S68). Note that the processing corresponding to the command data is performed every time the command data is transmitted from the reception side application (S69 to S71).

Moreover, it is configured that, in a case where the application for communicating a command of the game device or the like has ended in the reception side application, the reception side communication device 10Rx is notified of the end, and a release frame (SMLO Release) is generated and transmitted from the reception side communication device 10Rx to the transmission side communication device 10Tx (S72 and S73).

By receiving this release frame, the transmission side communication device 10Tx determines that it is no longer necessary to preferentially transmit the data of the access category (AC_BE) on the multi-link, and performs processing for releasing only this setting.

Then, the transmission side communication device 10Tx is configured to notify, by the beacon signal, of the single/multi-link operation information element (SMLO IE) such that setting of allowing preferential transmission of video data of single link (AC_VI) is left, it is returned to the initial state for the multi-link, and all data is transmitted on the basis of the normal priority order (existing priority order) (S74 and S75). Thus, in the transmission side communication device 10Tx, the video data from the transmission side application can be preferentially transmitted on the single link over data of other access categories (S76 to S78).

(Configuration of Information Element)

FIG. 18 illustrates an example of a configuration of a single/multi-link operation information element (SMLO IE: Single/Multi Link Operation Information Element) to which the present technology is applied.

This information element is configured to enable setting such that the communication device 10 such as the access point AP or the communication terminal STA can preferentially transmit data on the single link or the multi-link for each piece of data designated in the access category under the existing EDCA control.

The information element is included in the beacon signal transmitted by the access point AP for notification, and the communication terminal STA in the wireless communication network can perform control to transmit data of the access category used in the wireless communication network according to the priority designated by the information element.

This information element is identified with a predetermined element ID (Element ID), and includes an information length (Length), target latency information (Target Latency), a time available in TXOP on a single link (Single-Link TXOP Available), a map of access categories on a multi-link (Multi-Link Access Category Map), a map of access categories on a single link (Single-Link Access Category Map), and the like.

First Example

FIG. 19 illustrates a first example of configurations of the multi-link access category map and the single-link access category map included in the information element of FIG. 18.

FIG. 19 illustrates that data of all access categories can be transmitted as an initial setting state.

That is, on the multi-link access category map and the single-link access category map, all the access categories (AC_VO, AC_VI, AC_BE, and AC_BG) are described as "1".

In this example, the possibility of transmission is set by "1" and "0", and in a case where all the access categories are set to "1", it means that all the access categories are in a transmittable state, which represents a state where transmission is sequentially performed from voice data on the basis of the priority order of the existing access categories.

Second Example

FIG. 20 illustrates a second example of configurations of the multi-link access category map and the single-link access category map included in the information element of FIG. 18.

FIG. 20 illustrates an example of a case where settings for preferentially transmitting the video data of the access category (AC_VI) are made on both the multi-link and the single link.

That is, on the multi-link access category map and the single-link access category map, "1" is described in AC_VI, and "0" is described in the other access categories (AC_VO, AC_BE, and AC_BG).

Thus, the video data of the access category (AC_VI) is transmitted with the highest priority in both the multi-link and the single link, and it is configured that, in a case where the data of the access category no longer exists, the data of the other access categories is transmitted according to the predetermined priority order, for example, in the order of AC_VO, AC_VI, AC_BE, and AC_BG.

Third Example

FIG. 21 illustrates a third example of configurations of the multi-link access category map and the single-link access category map included in the information element of FIG. 18.

FIG. 21 illustrates an example of a case where setting for preferentially transmitting the video data of the access category (AC_VI) only on the single link is performed.

That is, while all the access categories (AC_VO, AC_VI, AC_BE, and AC_BG) are described as "1" on the multi-link access category map, "1" is described in AC_VI and "0" is described in the other access categories (AC_VO, AC_BE, and AC_BG) on the single-link access category map.

Thus, on the multi-link, for example, AC_VO, AC_VI, AC_BE, and AC_BG are transmitted in this order according to the priority order of the existing access categories, and on the single link, it is configured that the video data of the access category (AC_VI) is transmitted with the highest priority. Such a configuration is set in a case where another wireless communication system exists in the surroundings and it is difficult to use the wireless communication system as the multi-link.

Fourth Example

FIG. 22 illustrates a fourth example of configurations of the multi-link access category map and the single-link access category map included in the information element of FIG. 18.

FIG. 22 illustrates an example of a case where setting for preferentially transmitting the video data of the access category (AC_VI) and arbitrary best effort data of the access category (AC_BE) only on the multi-link is performed.

In other words, on the multi-link access category map, "1" is described in AC_VI and AC_BE, and "0" is described in other access categories (AC_VO and AC_BG). Furthermore, on the single-link access category map, all the access categories (AC_VO, AC_VI, AC_BE, and AC_BG) are described as "1".

Thus, on the multi-link, the video data of the access category (AC_VI, AC_BE) and the best effort data are preferentially transmitted, and on the single link, for example, it is configured that AC_VO, AC_VI, AC_BE, and AC_BG are transmitted in this order according to the priority order of the existing access categories. Such a configuration is set in a case where there is no other wireless communication system around and the most use is as the multi-link.

As described above, by using the access category map and setting the possibility of transmission by "1" and "0" with respect to each access category for each of the multi-link and the single link, it is possible to set information regarding the priority of transmission on the multi-link and information regarding the priority of transmission on the single link for each access category.

Note that, in the examples of FIGS. 19 to 22, the example of setting the access category maps of both the multi-link access category map and the single-link access category map has been described, but only at least one of the access category maps may be set. For example, information regarding the priority of transmission can be set only for the multi-link access category map.

Furthermore, in the examples of FIGS. 19 to 22, the example of setting the possibility of transmission by "1" and "0" using the access category map has been described, but any other setting method may be used as long as the method enables setting of the priority of transmission on the multi-link and single link for each access category.

Furthermore, in a case where the priority order of the access categories is different between the uplink and the downlink, information regarding the priorities of the uplink and the downlink may be set for each of the access categories. For example, in a case where a game is played by a device such as a smartphone or a game device, a case where it is desired to prioritize command data on the uplink and prioritize video data on the downlink is assumed.

In this case, on the multi-link or single-link access category map, it is only required that the best effort data (including command data) of the access category (AC_BE) is set to be preferentially transmitted on the uplink, and it is only required that the video data of the access category (AC_VI) is set to be preferentially transmitted on the downlink. When the access category map is stored in the information element (FIG. 18), it is possible to identify the uplink and the downlink by, for example, adding information (Direction) indicating a direction of transmission and reception of information.

As described above, since it is possible to cope with a case where the priority order of the access categories are different between the uplink and the downlink, transmission and reception of data can be controlled in more detail. Specifically, the access point AP can notify the communication terminal STA in advance of what data is to be sent at the time of download, or the communication terminal STA can notify the access point AP in advance of what order the data is to be sent in at the time of upload.

(Configuration of Operation Frame)

FIG. 23 is a diagram illustrating an example of a configuration of a single-link/multi-link operation frame (SMLO Request/Grant/Release) to which the present technology is applied.

This operation frame is a notification signal used to notify the access point AP or the transmission side communication device 10Tx of the setting of the access category that can be preferentially transmitted on the single link and the multi-link from the communication terminal STA or the reception side communication device 10Rx.

That is, the operation frame is configured as the request frame in a case where the operation frame is transmitted as a setting request, is configured as a grant frame in a case where the operation frame is transmitted as a response, and is configured as a release frame in a case where release is requested.

The operation frame includes information (Frame Control) for identifying a type of the frame, a duration of the frame, a transmission side communication device address (Transmit Address), a reception side communication device address (Receive Address), information (Direction) indicating a direction of transmission and reception of the information, information (Application) indicating a type of an application, information (Traffic ID) for identifying traffic, the above-described single/multi-link operation information element (Change SMLO IE) to be changed, and the like. Furthermore, a frame check sequence (FCS) for error detection is added to the end of the operation frame.

(Preferential Transmission Setting/Releasing)

Next, a flow of preferential transmission setting/releasing operation of the single link and the multi-link will be described with reference to flowcharts of FIGS. 24 and 25.

In step S101, the single/multi-link operation control unit 104 determines whether a specific application is activated.

The specific application includes an application of real-time data distribution and an application such as a game application.

In a case where it is determined in the determination processing of step S101 that the specific application is activated, the processing proceeds to step S102. In step S102, the single/multi-link operation control unit 104 acquires attributes and parameters necessary for the specific application.

In step S103, the single/multi-link operation control unit 104 determines whether a latency request has been made. In a case where it is determined in the determination processing of step S103 that there is no latency request, the processing returns to step S101.

In a case where it is determined in the determination processing of step S103 that there is a short latency request, the processing proceeds to step S104. In step S104, the single/multi-link operation control unit 104 acquires setting information of the current preferential transmission of the single link and the multi-link.

In step S105, the single/multi-link operation control unit 104 determines whether it is a situation that setting of preferential transmission is necessary. In a case where it is determined in the determination processing of step S105 that the setting of preferential transmission is unnecessary, the processing returns to step S101.

In a case where it is determined in the determination processing of step S105 that it is a situation that the setting of preferential transmission is necessary, the processing proceeds to step S106, and the processing of steps S106 to S113 is executed by the single/multi-link operation control unit 104.

That is, operating state information regarding the operating state of another wireless communication system is acquired (S106), the preferential transmission on the single link and the multi-link is determined (S107), and the setting for preferentially transmitting data of the access category corresponding to the specific application is performed (S108).

Here, the setting status of the current preferential transmission on the single link and the multi-link is acquired, and it is determined whether the preferential transmission setting can be performed in either or both of the single link and the multi-link for data of a specific access category on the basis of the parameters necessary for the specific application.

At this time, in a case where the own device is the transmission side communication device 10Tx and operating as the access point AP ("Yes" in S109 and "Yes" in S110), the parameters are described in the single/multi-link operation information element (SMLO IE) (S111). Thus, setting information of the single/multi-link operation information element (SMLO IE) is updated, and a notification of the information is given by the subsequent beacon signal.

On the other hand, in a case where the own device is the reception side communication device 10Rx of the specific application ("No" in S109), the single-link/multi-link operation frame (request frame) including a request for the preferential transmission setting is transmitted to the transmission side communication device 10Tx (S112).

In a case of receiving the single-link/multi-link operation frame (grant frame) as a response to the request frame ("Yes" in S113), the transmission setting has been performed in the transmission side communication device 10Tx. Note that in a case where the grant frame has not been received ("No" in S113), the processing returns to step S107, and the determination of preferential transmission on the single link and the multi-link is performed again.

Note that, in a case where the own device is the transmission side communication device 10Tx but is not operating as the access point AP ("Yes" in S109 and "No" in S110), in a case where the processing of step S111 has ended, or in a case where the own device is the reception side communication device 10Rx and receives the grant frame as a response to the request frame ("No" in S109 and "Yes" in S112 and S113), the processing returns to step S101.

Figure 25:
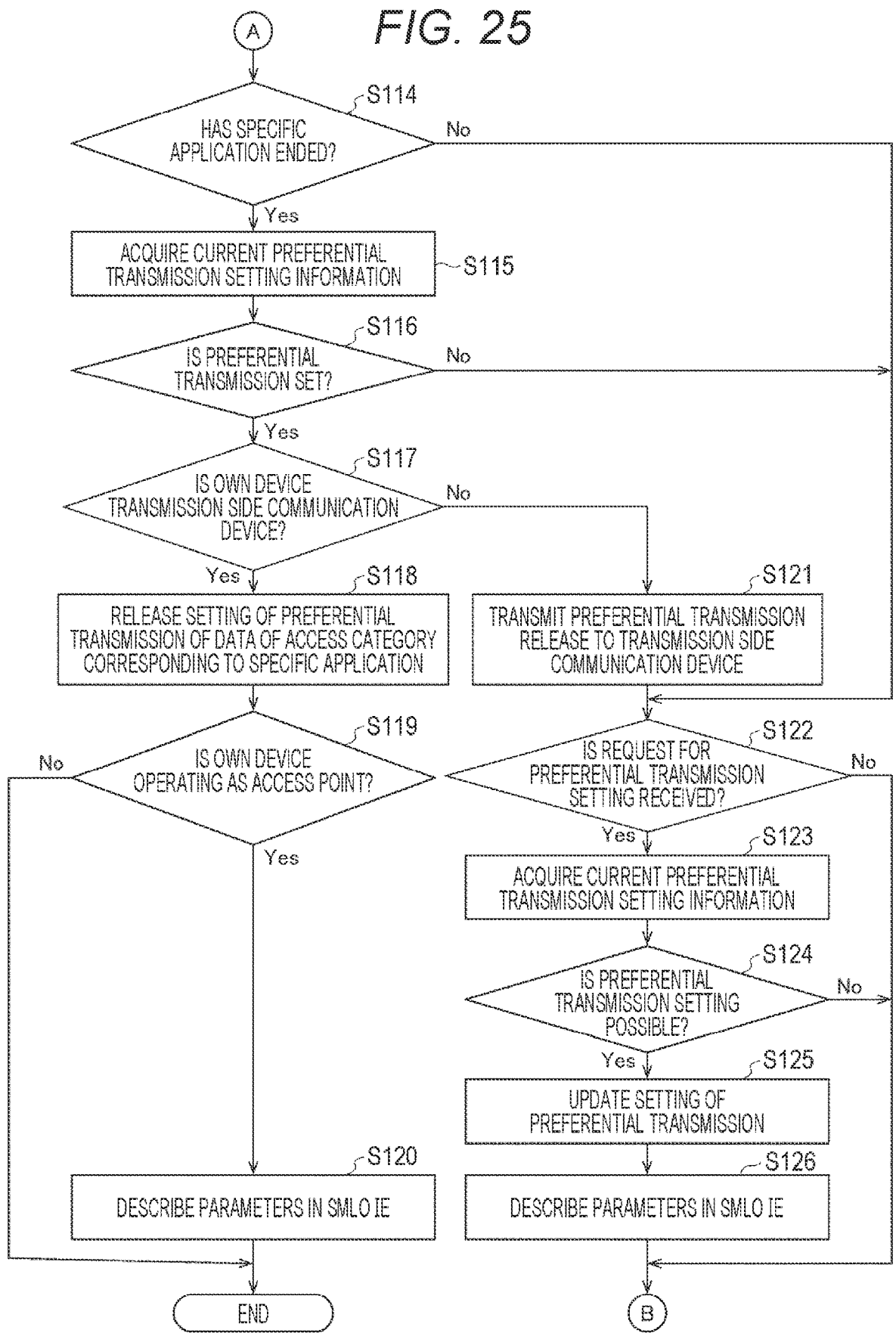
FIG. 25 is a flowchart illustrating the flow of the preferential transmission setting/releasing processing.

On the other hand, in a case where it is determined in the determination processing of step S101 that the specific application is not activated, the processing proceeds to step S114 of FIG. 25.

In step S114, the single/multi-link operation control unit 104 determines whether the specific application is ended.

In a case where it is determined in the determination processing of step S114 that the specific application has ended, the processing proceeds to step S115. In step S115, the single/multi-link operation control unit 104 acquires preferential transmission setting information related to the current preferential transmission setting.

In step S116, the single/multi-link operation control unit 104 determines whether preferential transmission is set on the basis of the preferential transmission setting information.

In a case where it is determined in the determination processing of step S116 that the preferential transmission is set, the processing proceeds to step S117, and the processing of steps S117 to S126 is executed by the single/multi-link operation control unit 104.

That is, in a case where the own device is the transmission side communication device 10Tx ("Yes" in S117), the setting of the preferential transmission of data of the access category corresponding to the specific application is released (S118). Then, in a case where the own device operates as the access point AP ("Yes" in S119), the parameters are described in the single/multi-link operation information element (SMLO IE) (S120).

Thus, the setting information of the single/multi-link operation information element (SMLO IE) is updated, and a notification of the information is given by the subsequent beacon signal. Note that in a case where the own device does not operate as the access point AP ("No" in S119), the process in step S120 is skipped, and the series of operations ends.

Furthermore, in a case where the own device is not the transmission side communication device 10Tx but the reception side communication device 10Rx ("No" in S117), the single-link/multi-link operation frame (release frame) including release of the preferential transmission setting is transmitted to the transmission side communication device 10Tx (S121).

In a case where the processing in step S121 has ended, in a case where the specific application has not ended ("Yes" in S114), or in a case where the preferential transmission has not been set ("No" in S116), the processing proceeds to step S122. Then, in a case of receiving the single-link/multi-link operation frame (request frame) including the request for the preferential transmission setting from another device (for example, the reception side communication device 10Rx) ("Yes" in S122), the preferential transmission setting information related to the current preferential transmission setting is acquired (S123).

Here, in a case where the presence or absence of the preferential transmission setting is grasped on the basis of the preferential transmission setting information, and the preferential transmission setting is possible ("Yes" in S124), the setting of preferential transmission is updated for the new preferential transmission (S125), and the parameters are described in the single/multi-link operation information element (SMLO IE) (S126). Thus, the setting information of the single/multi-link operation information element (SMLO IE) is updated, and a notification of the information is given by the subsequent beacon signal.

Figure 24:
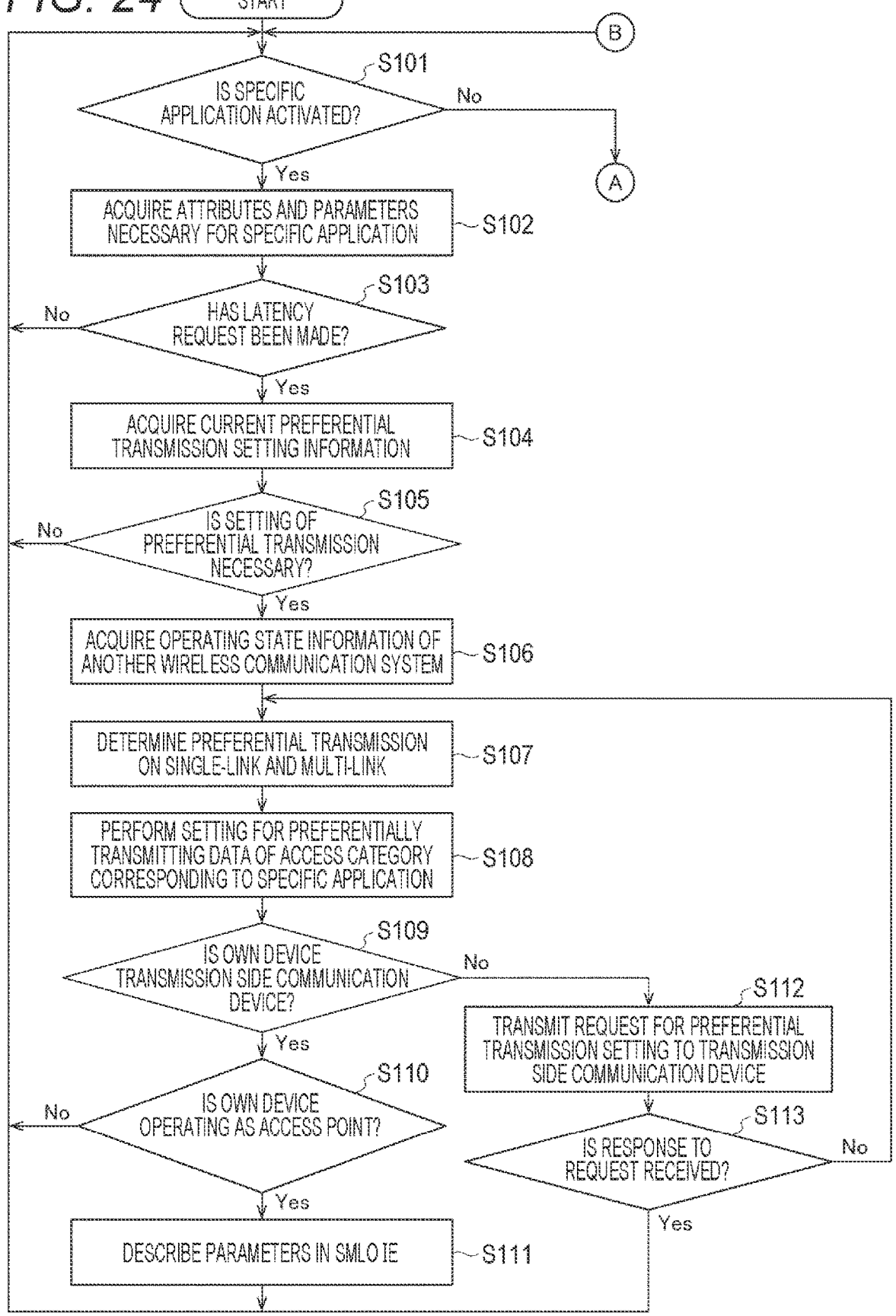
FIG. 24 is a flowchart illustrating a flow of preferential transmission setting/releasing processing.

In a case where the processing in step S126 has ended, in a case where the request frame has not been received from another device ("No" in S122), or in a case where the preferential transmission setting cannot be performed ("No" in S124), the processing returns to step S101 in FIG. 24. By repeatedly performing the series of processes, the preferential transmission is set for an arbitrary application.

The flow of the preferential transmission setting/releasing operation of the single link and the multi-link has been described above.

(Access Control)

Figure 26:
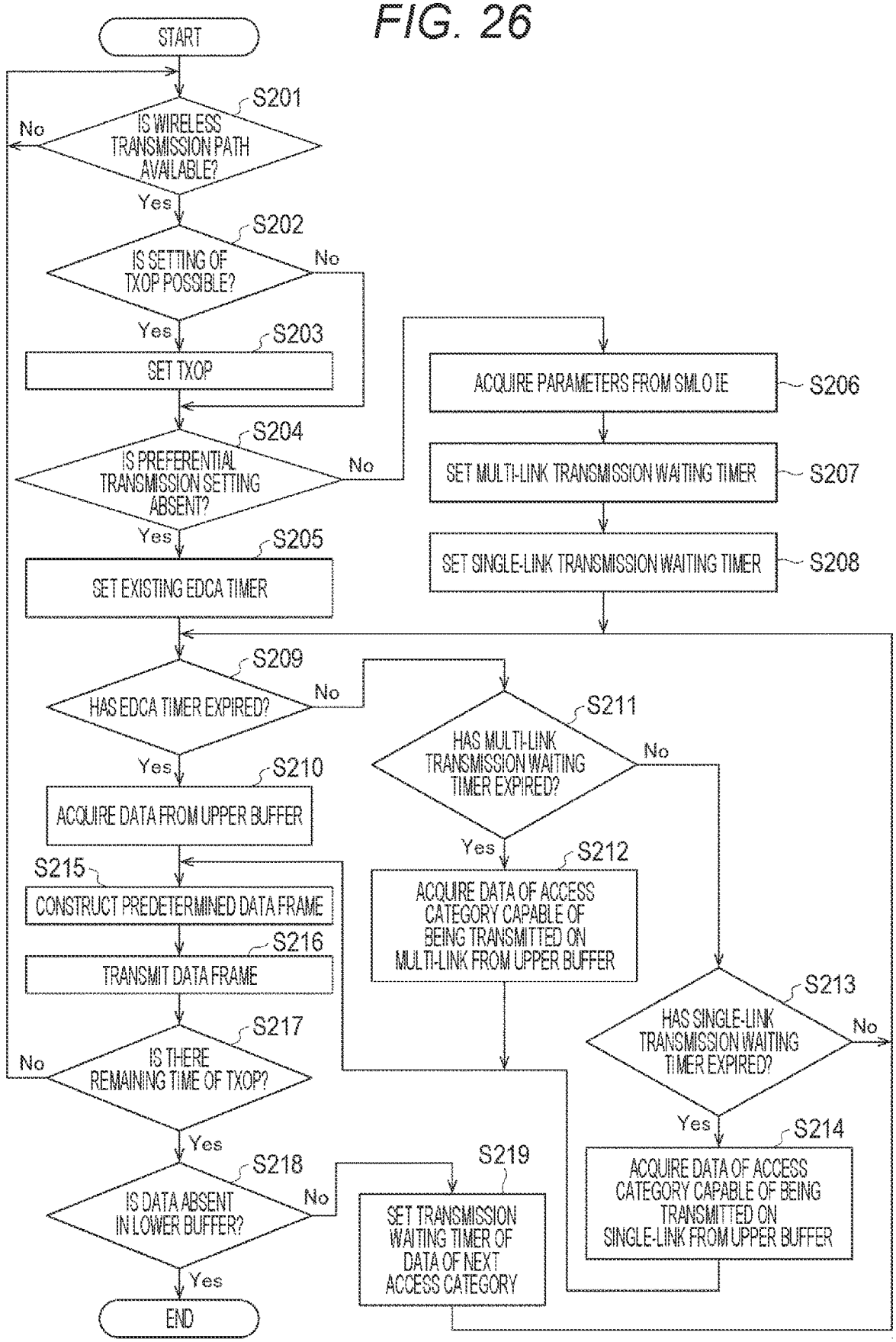
FIG. 26 is a flowchart illustrating a flow of access control processing.

Next, a flow of operation of access control of the single link and the multi-link will be described with reference to a flowchart of FIG. 26.

In step S201, in a case where there is data to be transmitted, the access control unit 108 determines the possibility of using the wireless transmission path.

In a case where it is determined in the determination processing of step S201 that the wireless transmission path is available, the processing proceeds to step S202. In step S202, the access control unit 108 determines the possibility of setting a transmission opportunity (TXOP) for a certain period.

In a case where it is determined in the determination processing of step S202 that the transmission opportunity (TXOP) can be set, the processing proceeds to step S203. In step S203, the access control unit 108 sets the period as a transmission opportunity (TXOP). Note that, in a case where it is determined in the determination processing of step S202 that the transmission opportunity (TXOP) cannot be set, the processing of step S203 is skipped, and the processing proceeds to step S204.

In step S204, the access control unit 108 determines the presence or absence of the preferential transmission setting.

In a case where it is determined in the determination processing of step S204 the absence of the preferential transmission setting, the processing proceeds to step S205. In step S205, the access control unit 108 sets an EDCA timer according to the data of each access category stored in the transmission buffer 103 on the basis of the existing EDCA access control method (S205).

On the other hand, in a case where it is determined in the determination processing of step S204 that the preferential transmission setting has been made, the processing proceeds to step S206, and the processing of steps S206 to S208 is executed.

That is, the parameters described in the current single/multi-link operation information element (SMLO IE) are acquired (S206), and if there is data corresponding to the access category for which transmission is set among the single link and the multi-ink described therein, a multi-ink transmission waiting timer is set (S207) or a single-link transmission waiting timer is set (S208) according to the setting.

When step S205 or S208 ends, the processing proceeds to step S209, and the processing of steps S209 to S216 is executed.

That is, in a case where the EDCA timer has expired ("Yes" in S209), data is acquired from an upper buffer of the access category (S210). Furthermore, in a case where the multi-link transmission waiting timer has expired ("Yes" in S211), data of the access category capable of being transmitted on the multi-link is acquired from the upper buffer of the access category (S212). Moreover, in a case where the single-link transmission waiting timer has expired ("Yes" in S213), data of the access category capable of being transmitted on the single link is acquired (S214).

Note that an upper buffer is the transmission buffer 103 that stores data of an access category in higher priority order, and a lower buffer is the transmission buffer 103 that stores data of an access category in lower priority order. Furthermore, in a case where it is determined in the determination processing of steps S209, S211, and S213 that none of the timers has expired, the processing returns to step S209, and the transmission waiting operation is repeated until the transmission waiting timer expires.

Then, a predetermined data frame is constructed from the transmission data acquired in this manner (S215), and the constructed data frame is transmitted via the wireless transmission path (S216). At this time, in a case of operating as the single link, only one link is used, and in a case of operating as the multi-link, a plurality of links is used.

In step S217, the access control unit 108 determines whether there is a remaining time of the transmission opportunity (TXOP).

It is configured that, in a case where it is determined in the determination processing of step S217 that there is no remaining time of the transmission opportunity (TXOP), the data transmission up to that point is completed, the processing returns to step S201, and the access control procedure is executed again.

Furthermore, in a case where it is determined in the determination processing of step S217 that there is a remaining time of the transmission opportunity (TXOP), the processing proceeds to step S218. In step S218, the access control unit 108 determines the presence or absence of data stored in the lower buffer.

That is, when there is a remaining time of the transmission opportunity (TXOP) after predetermined data (for example, data of the access category in high priority order) is transmitted, the presence or absence of data of still another access category is sequentially confirmed from (the upper buffer storing the data of) the upper access category to (the lower buffer storing the data of) the lower access category, and in a case where data to be transmitted here is absent ("Yes" in S218), the series of transmission operations is ended.

On the other hand, in a case where the data to be transmitted is present ("No" in S218), the access control unit 108 sets a transmission waiting timer for data of the next access category according to the priority order of the access category (S219). Then, the processing returns to step S209, and the transmission waiting operation is repeated until the transmission waiting timer expires.

The flows of operations of the access control of the single link and the multi-link has been described above.

<2. Modification Examples>

(Other Configuration Examples)

As described above, the transmission side communication device 10Tx can be configured as, for example, the access point AP10 (base station), and the reception side communication device 10Rx can be configured as, for example, the communication terminal STA10 (terminal station). However, the transmission side communication device 10Tx or the reception side communication device 10Rx may be configured as a part (for example, a wireless communication module, a wireless chip, or the like) of a device (component) configuring the access point AP10 or the communication terminal STA10.

Furthermore, for example, the reception side communication device 10Rx configured as the communication terminal STA10 can be configured as an electronic device having a wireless communication function, such as a smartphone, a tablet-type terminal, a game device, a mobile phone, a personal computer, a digital camera, a television receiver, a wearable terminal, or a speaker device.

Moreover, the communication terminal STA10 may be a device that supports only data transmission such as a controller that transmits command data corresponding to a user's operation, or a device that supports only data reception such as a display device that receives and displays video data. Note that the user can play a game by using a dedicated game device or by installing a game application in the communication terminal STA10 such as a smartphone.
(Plurality of Links)

In the above description, the case where the two links of the first link (Link #1) and the second link (Link #2) are used as the plurality of links when the multi-link is implemented has been exemplified, but the control can be similarly performed in a case of using three or more links such as a case where the third link (Link #3) is further included.

As described above, the present technology proposes a configuration in which the information regarding the priority of transmission on the multi-link and the information regarding the priority of transmission on the single link are set for each data access category. Thus, in order to selectively acquire a transmission opportunity (TXOP) by preferential transmission control of the single-link operation and the multi-link operation, a preferential transmission access control method of outputting data of a designated access category is provided as a method of performing preferential communication using the single link and the multi-link according to the access category of data to be transmitted, and data can be transmitted with a shorter waiting time.

That is, the present technology provides an access control method of controlling the possibility of communication by using each of the multi-link and the single link according to the attribute of data to be transmitted, and for example, the access point AP10 specifies the attribute of data, and the communication terminal STA10 can perform transmission according to control thereof.

Normally, transmission control is performed in the order of access categories based on the existing priority order, but in a case where data requiring a short latency is stored in the transmission buffer 103 as a specific access category, the data of the access category can be preferentially transmitted on the multi-link or the single link with a short waiting time.

That is, in the present technology, it is configured that transmission on the single link and the transmission on the multi-link can be individually set for each attribute (access category) of the transmission data stored in the transmission buffer 103, so that the data of the specific access category can be transmitted with a latency shorter than a predetermined period while the application designated by the user is operating.

Thus, for example, it is possible to have setting or the like such that control is performed to transmit data of all access categories by existing transmission control normally on the single link and the multi-link, data of an access category for which data of an application requiring a real-time property is stored is transmitted on the single link and the multi-link, and data of other access categories is transmitted by using the multi-link. Note that, normally, original EDCA control can be performed by fairly setting transmission opportunities (TXOP) of data of all access categories on both the single link and the multi-link.

Furthermore, for data requiring a short latency by performing multi-link operation, it is possible to obtain more transmission opportunities (TXOP) by setting the transmission opportunity (TXOP) on at least one of the single link or the multi-link. By setting such a transmission opportunity preferentially, even data in lower priority order of transmission by the existing EDCA control can be preferentially transmitted.

That is, in the existing EDCA control, the priority of transmission is determined according to the access category of data to be transmitted, but in the present technology, the user can designate the priority of data to be transmitted on the single link separately from the existing access category, and thus the data requiring a real-time property can be transmitted in preference to the voice data from the other communication device 10. Furthermore, specific data can be preferentially transmitted without further providing a transmission buffer for performing preferential transmission with respect to the structure of the existing transmission buffer.

Furthermore, there is provided a method for preferentially transmitting data with a real-time property by transmitting a request frame as a preferential transmission control request notification from the reception side communication device 10Rx to the transmission side communication device 10Tx even in a case where the application is activated from the reception side communication device 10Rx. On the other hand, even in a case where the end of application is instructed from the reception side communication device 10Rx, a method of releasing the preferential transmission by transmitting a release frame as a preferential transmission control release notification from the reception side communication device 10Rx to the transmission side communication device 10Tx is provided, and a method of further transmitting other data is obtained.

Note that Patent Document 1 described above discloses a configuration and a control technique such that, in a wireless device capable of simultaneously transmitting a plurality of frames to the same destination by using a plurality of frequency channels, a frame in a buffer is output to a first transmission means in a case where the vacancy of the first frequency channel continues for a first period, and a frame in the buffer is output to a second transmission means in a case where the vacancy of the second frequency channel continues for a second period. However, this configuration is to transmit a frame in a case where a waiting time of different channels expires on a first single link and a second single link, and does not include a configuration to set a transmission waiting time of either one on a single link and a waiting time of both on a multi-link are set, and the effects of the present technology described above cannot be obtained.
(Configuration of Computer)

The processing of each step of the above-described flowchart can be executed by hardware or software. In a case where the series of processes is executed by software, a program constituting the software is installed in a computer of each device.

Here, in the present description, the processing performed by the computer according to the program does not necessarily have to be performed in time series in the order described as the flowchart. That is, the processing performed by the computer according to the program also includes processing that is executed in parallel or individually (for example, parallel processing or object processing).

Furthermore, the program may be processed by one computer (processor) or may be processed in a distributed manner by a plurality of computers. Moreover, the program may be transferred to a distant computer and executed.

Moreover, in the present description, the system means a set of a plurality of components (devices, modules (parts), and the like), and it does not matter whether or not all the components are in the same housing.

Note that the embodiments of the present technology are not limited to the above-described embodiments, and various modifications are possible without departing from the scope of the present technology.

Furthermore, each step described in the above-described flowchart can be executed by one device, or can be executed in a shared manner by a plurality of devices. Moreover, in a case where a plurality of processes is included in one step, the plurality of processes included in the one step can be executed in a shared manner by a plurality of devices in addition to being executed by one device.

Furthermore, the effects described in the present description are merely examples and are not limited, and other effects may be provided.

Note that the present technology can also employ the following configurations.

(1)

A communication device including a control unit that sets information regarding a priority of transmission on a plurality of links for each of access categories of data in a case where data is transmitted using a plurality of links corresponding to a predetermined frequency band.

(2)

The communication device according to (1) above, in which the control unit sets information regarding a priority of transmission on one link for each of the access categories.

(3)

The communication device according to (1) above, in which the control unit sets information regarding priorities of uplink and downlink for each of the access categories.

(4)

The communication device according to (2) above, in which the control unit performs control in such a manner that preferential transmission on a plurality of links and fair transmission on one link are performed in all access categories.

(5)

The communication device according to (2) above, in which the control unit performs control in such a manner that transmission on a plurality of links or one link is enabled in an access category in which specific data exists, and fair transmission is performed in other access categories.

(6)

The communication device according to (5) above, in which the specific data includes data required to be transmitted with a latency shorter than a predetermined period.

(7)

The communication device according to (5) above, in which the control unit sets a transmission priority for each of access categories of the specific data in a case where an application requiring real-time property is activated.

(8)

The communication device according to (5) above, in which in a case where data is not stored in a transmission buffer corresponding to a specific access category, the control unit performs control to transmit data stored in another transmission buffer.

(9)

The communication device according to (8) above, in which the control unit performs control to transmit data in order of higher priority among data stored in a transmission buffer corresponding to another access category.

(10)

The communication device according to (7) above, in which in a case where the communication device is a communication device on a reception side of the application, the control unit performs control to transmit, to a communication device on a transmission side of data used in the application, a notification signal for requesting preferential transmission of the data.

(11)

The communication device according to (7) above, in which in a case where the communication device is a communication device on a transmission side of data used in the application, when receiving a notification signal for requesting preferential transmission of the data from a communication device on a reception side of the application, the control unit performs control to preferentially transmit data of a specific access category.

(12)

The communication device according to (2) above, in which in a case where the communication device operates as an access point, the control unit performs control to transmit a beacon signal in which an information element including information regarding a priority of transmission on a plurality of links or a priority of transmission on one link is described.

(13)

The communication device according to (7), (10), or (11) above, in which in a case where the application has ended, the control unit performs control in such a manner that transmission on a plurality of links or transmission on one link is performed fairly in all access categories.

(14)

The communication device according to (13) above, in which in a case where the communication device is a communication device on a reception side of the application, the control unit performs control to transmit, to a communication device on a transmission side of data used in the application, a notification signal for requesting release of preferential transmission of the data.

(15)

The communication device according to (13) above, in which in a case where the communication device is a communication device on a transmission side of data used in the application, when receiving a notification signal for requesting release of preferential transmission of the data from a communication device on a reception side of the application, the control unit performs control in such a manner that transmission on a plurality of links or transmission on one link is performed fairly.

(16)
The communication device according to any one of (1) to (15) above, in which
each link of the plurality of links includes a discontinuous frequency band, and
the control unit controls wireless communication using frequency bands corresponding to a plurality of links.

(17)
The communication device according to (2) above, in which
the control unit sets a possibility of transmission on a plurality of links or a possibility of transmission on one link for each of the access categories.

(18)
The communication device according to any one of (1) to (17) above, in which
the access category includes voice, video, best effort, and background.

(19)
The communication device according to (3) above, in which
the control unit
sets an uplink priority of a specific access category to be the highest, and
sets priority of downlink of other access categories to be the highest.

(20)
A communication method including,
by a communication device,
setting information regarding a priority of transmission on a plurality of links for each of access categories of data in a case where data is transmitted using a plurality of links corresponding to a predetermined frequency band.

REFERENCE SIGNS LIST 1-1 Wireless LAN system
10 Communication device
11 Network connection module
12 Information input module
13 Device control module
14 Information output module
15 Wireless communication module
101 Interface
102 Category determination unit
103 Transmission buffer
103-1 AC_VO buffer
103-2 AC_VI buffer
103-3 AC_BE buffer
103-4 AC_BG buffer
104 Single/multi-link operation control unit
105 Dequeue control unit
106 Timing control unit
107 Frame construction unit
108 Access control unit
109-1, 109-2 Transmission processing unit
110 Antenna control unit
111-1, 111-2 Reception processing unit
112 Frame extraction unit
113 Data analysis unit
114 Reception buffer
115 Output data construction unit

The invention claimed is:
1. A communication device, comprising:
a processor configured to:
set, for each of a plurality of access categories of a plurality of pieces of data, first information associated with a priority of transmission by a plurality of links, wherein the plurality of links corresponds to a specific frequency band;
set, for each of the plurality of access categories, second information associated with a priority of transmission by one link of the plurality of links;
set, for each of the plurality of access categories, at least one of a first possibility of transmission on the plurality of links or a second possibility of transmission on the one link; and
control, based on the set first information, the set second information, and at least one of the set first possibility of transmission or the set second possibility of transmission, transmission of the plurality of pieces of data by the plurality of links.

2. The communication device according to claim 1, wherein the processor is further configured to:
set, for each of the plurality of access categories, third information associated with a priority of an uplink and a priority of a downlink.

3. The communication device according to claim 2, wherein the processor is further configured to:
set, as a highest priority, the priority of the uplink of a specific access category form the plurality of access categories; and
set, as a highest priority, the priority of the downlink of a set of access categories from the plurality of access categories, wherein the set of access categories are different from the specific access category.

4. The communication device according to claim 1, wherein
the processor is further configured to control, for each of the plurality of access categories, a preferential transmission by the plurality of links and a fair transmission by the one link.

5. The communication device according to claim 1, wherein the processor is further configured to:
enable transmission, by at least one of the plurality of links or the one link, for a specific access category of the plurality of access categories, wherein
the specific access category corresponds to a category of specific data, and
the plurality of pieces of data includes the specific data; and
control a fair transmission for a set of access categories different from the specific access category, wherein the plurality of access categories includes the set of access categories.

6. The communication device according to claim 5, wherein the specific data requires transmission with a latency shorter than a specific period.

7. The communication device according to claim 5, wherein the processor is further configured to:
detect an activation of an application that requires a plurality of real-time properties; and
set, based on the detected activation of the application, a transmission priority for each of the plurality of access categories of the plurality of pieces of data.

8. The communication device according to claim 7, wherein
the communication device is a communication device on a transmission side of the application, and the processor is further configured to:
control reception of a notification signal from a communication device on a reception side of the application, wherein the notification signal includes a request for a preferential transmission of the plurality of pieces of data; and
control, based on the reception of the notification signal, the preferential transmission of the specific data of the specific access category.

9. The communication device according to claim 7, wherein
the communication device is a communication device on a reception side of the application,
the processor is further configured to control transmission of a notification signal, to a communication device on a transmission side of the application, and
the notification signal includes a request for a preferential transmission of the plurality of pieces of data.

10. The communication device according to claim 7, wherein the processor is further configured to:
detect a termination of the application; and
control the fair transmission, by at least one of the plurality of links or the one link, for each of the plurality of access categories.

11. The communication device according to claim 10, wherein
the communication device is a communication device on a reception side of the application,
the processor is further configured to control transmission of a notification signal to a communication device on a transmission side of the application, and
the notification signal includes a request to terminate a preferential transmission of the plurality of pieces of data.

12. The communication device according to claim 10, wherein
the communication device is a communication device on a transmission side of the application, and
the processor is further configured to:
control reception of a notification signal from a communication device on a reception side of the application, wherein the notification signal includes a request to terminate a preferential transmission of the plurality of pieces of data; and
control, based on the reception of the notification signal, the fair transmission by at least one of the plurality of links or the one link.

13. The communication device according to claim 5, wherein the processor is further configured to:
detect an absence of the specific data in a first transmission buffer corresponding to the specific access category,
control, based on the detected absence, transmission of a set of pieces of data in a second transmission buffer different from the first transmission buffer, wherein
the set of pieces of data is different from the specific data, and
the plurality of pieces of data includes the set of pieces of data.

14. The communication device according to claim 13, wherein the processor is further configured to control transmission of the set of pieces of data in an order of higher priority, and
the second transmission buffer is corresponding to the set of access category.

15. The communication device according to claim 1, wherein
the communication device operates as an access point,
the processor is further configured to control transmission of a beacon signal, and
the beacon signal includes one of the first information or the second information.

16. The communication device according to claim 1, wherein
each of the plurality of links includes a discontinuous frequency band, and
the processor is further configured to control a wireless communication based on the specific frequency band corresponding to the plurality of links.

17. The communication device according to claim 1, wherein the plurality of access categories includes voice, video, best effort, and background.

18. A communication method, comprising:
in a communication device:
setting, for each of a plurality of access categories of a plurality of pieces of data, first information associated with a priority of transmission by a plurality of links, wherein the plurality of links corresponds to a specific frequency band;
setting, for each of the plurality of access categories, second information associated with a priority of transmission by one link of the plurality of links;
setting, for each of the plurality of access categories, at least one of a first possibility of transmission on the plurality of links or a second possibility of transmission on the one link; and
controlling, based on the set first information, the set second information, and at least one of the set first possibility of transmission or the set second possibility of transmission, transmission of the plurality of pieces of data by the plurality of links.

19. A communication device, comprising:
a processor configured to:
set, for each of a plurality of access categories of a plurality of pieces of data, first information associated with a priority of transmission by a plurality of links, wherein
the plurality of links corresponds to a specific frequency band, and
the communication device operates as an access point;
set, for each of the plurality of access categories, second information associated with a priority of transmission by one link of the plurality of links;
control transmission of a beacon signal, wherein the beacon signal includes one of the first information or the second information; and
control, based on the set first information and the set second information, transmission of the plurality of pieces of data by the plurality of links.

* * * * *